(12) United States Patent
Shiraishi

(10) Patent No.: US 8,150,152 B2
(45) Date of Patent: Apr. 3, 2012

(54) DEVICE AND METHOD FOR ENCODING IMAGE DATA

(75) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 895 days.

(21) Appl. No.: 12/193,135

(22) Filed: Aug. 18, 2008

(65) Prior Publication Data

US 2009/0060325 A1 Mar. 5, 2009

(30) Foreign Application Priority Data

Aug. 31, 2007 (JP) ................................. 2007-225088

(51) Int. Cl.
*G06K 9/00* (2006.01)
*G06K 9/36* (2006.01)
*G06K 9/46* (2006.01)

(52) U.S. Cl. ....................................... 382/166; 382/233

(58) Field of Classification Search .................. 382/162, 382/166, 173, 232, 233, 236, 238, 244–246, 382/248–253; 348/231; 345/501
See application file for complete search history.

(56) References Cited

U.S. PATENT DOCUMENTS

| | | | | |
|---|---|---|---|---|
| 6,058,210 | A * | 5/2000 | de Queiroz et al. ........... 382/232 |
| 6,915,017 | B2 | 7/2005 | Shiraishi | |
| 6,941,023 | B2 | 9/2005 | Shiraishi | |
| 7,009,622 | B2 | 3/2006 | Shiraishi | |
| 7,079,691 | B2 | 7/2006 | Shiraishi | |
| 7,233,702 | B2 | 6/2007 | Shiraishi | |
| 7,359,557 | B2 | 4/2008 | Shiraishi | |
| 2003/0202603 | A1 * | 10/2003 | Chen et al. ............... 375/240.25 |
| 2005/0062994 | A1 | 3/2005 | Shiraishi | |
| 2005/0151991 | A1 | 7/2005 | Shiraishi | |
| 2005/0207667 | A1 | 9/2005 | Shiraishi | |
| 2005/0246684 | A1 | 11/2005 | Shiraishi | |
| 2006/0072142 | A1 | 4/2006 | Shiraishi | |
| 2009/0060325 | A1 * | 3/2009 | Shiraishi ....................... 382/166 |
| 2011/0002551 | A1 * | 1/2011 | Fukuma ....................... 382/232 |
| 2011/0002553 | A1 * | 1/2011 | Nishikawa et al. ........... 382/233 |

FOREIGN PATENT DOCUMENTS

| | | |
|---|---|---|
| JP | 2002-142118 | 5/2002 |
| JP | 2003-198379 | 7/2003 |
| JP | 2005-27081 | 1/2005 |
| JP | 3842914 | 8/2006 |
| JP | 3862969 | 10/2006 |
| JP | 3865203 | 10/2006 |

* cited by examiner

*Primary Examiner* — Amir Alavi
(74) *Attorney, Agent, or Firm* — Oblon, Spivak, McClelland, Maier & Neustadt, L.L.P.

(57) ABSTRACT

A reading unit reads image data. A re-reading unit that re-reads the image data read by the reading unit by performing, in a pixel matrix consisting of a plurality of pixels of the image data read by the reading unit, a process of scanning pixels in a partition in which at least two pixels are respectively aligned in a column direction and in a row direction in a predetermined order in a predetermined alignment sequence of partitions. A multivalue run length-encoding unit encodes the image data re-read by the re-reading unit to multivalue run length data indicating at least color data and run lengths of the color data.

20 Claims, 26 Drawing Sheets

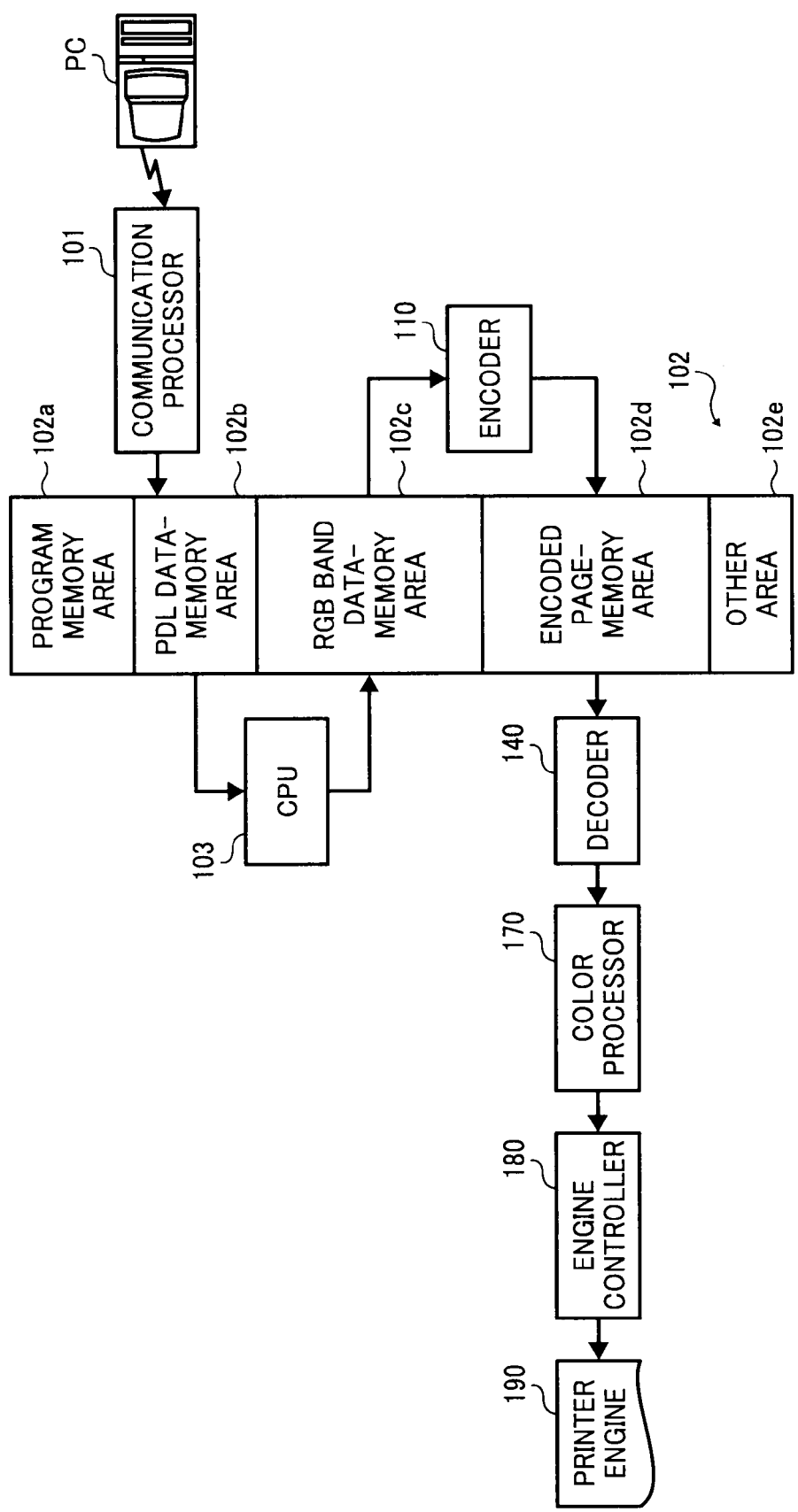

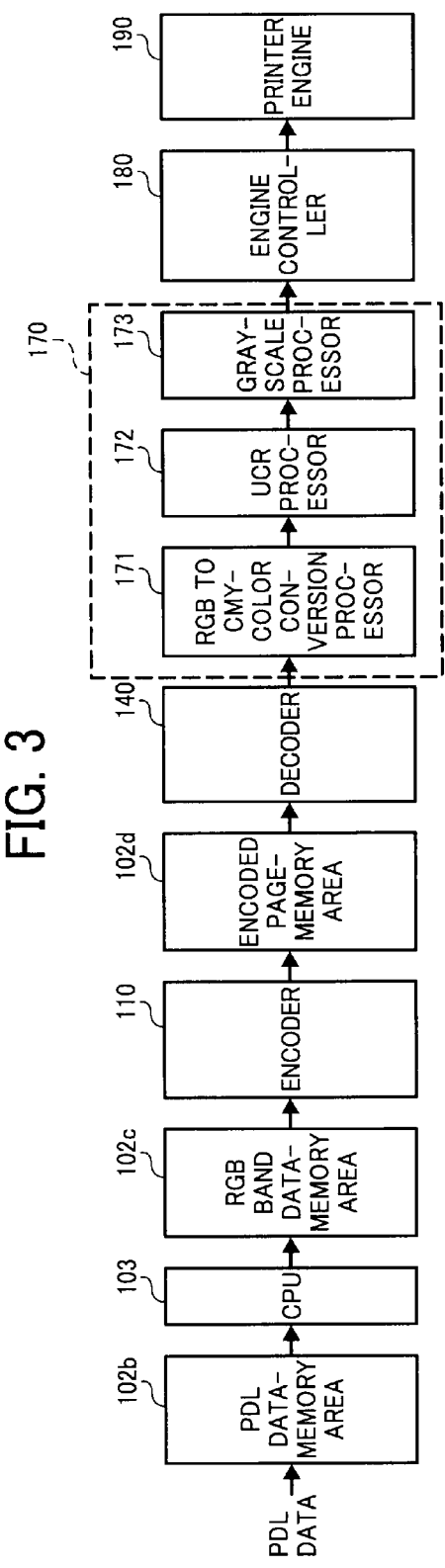
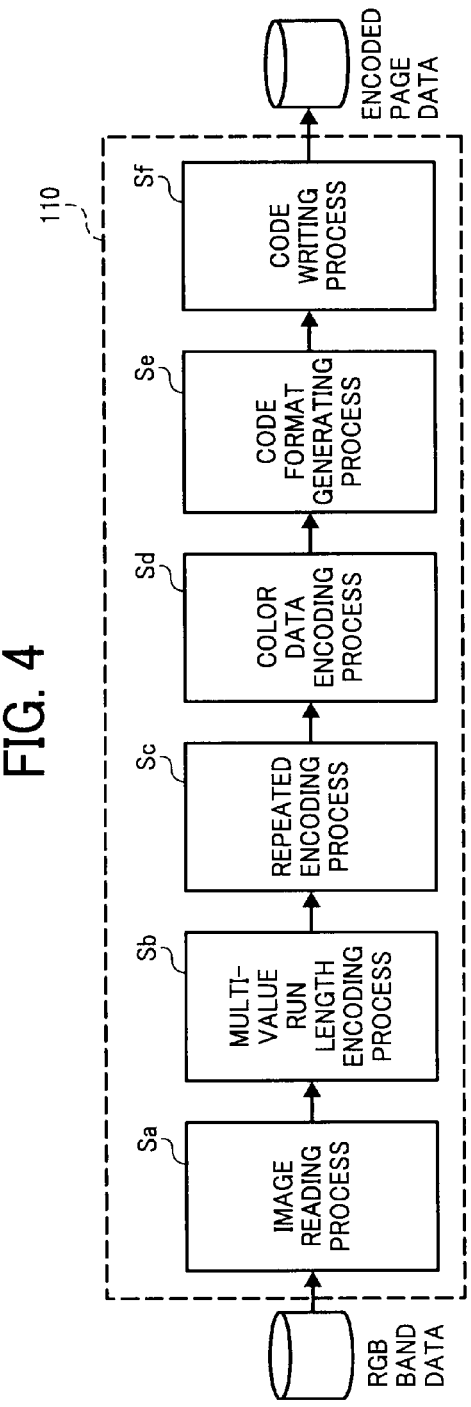

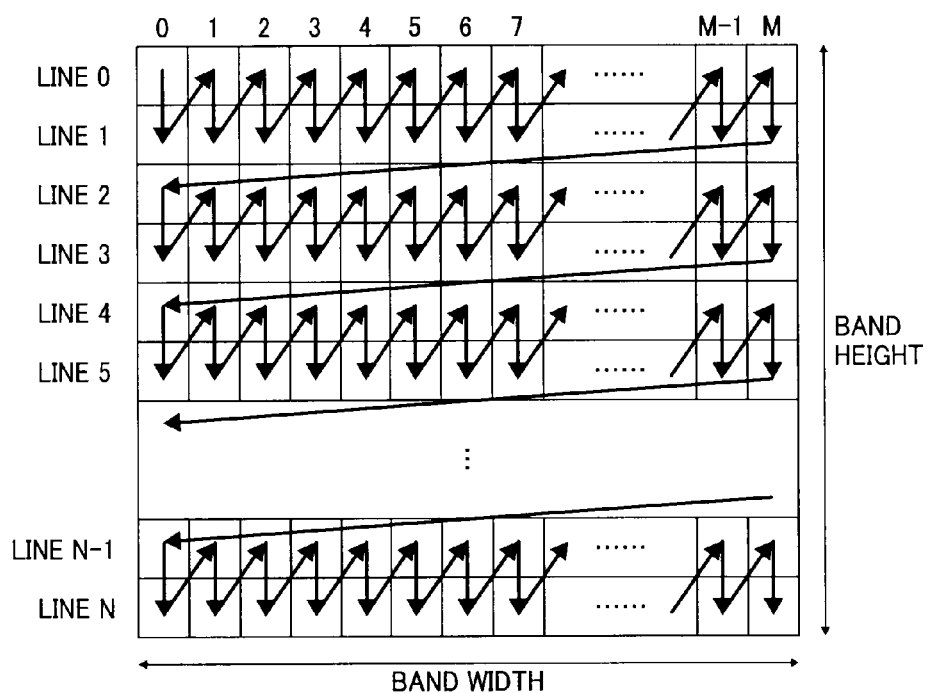

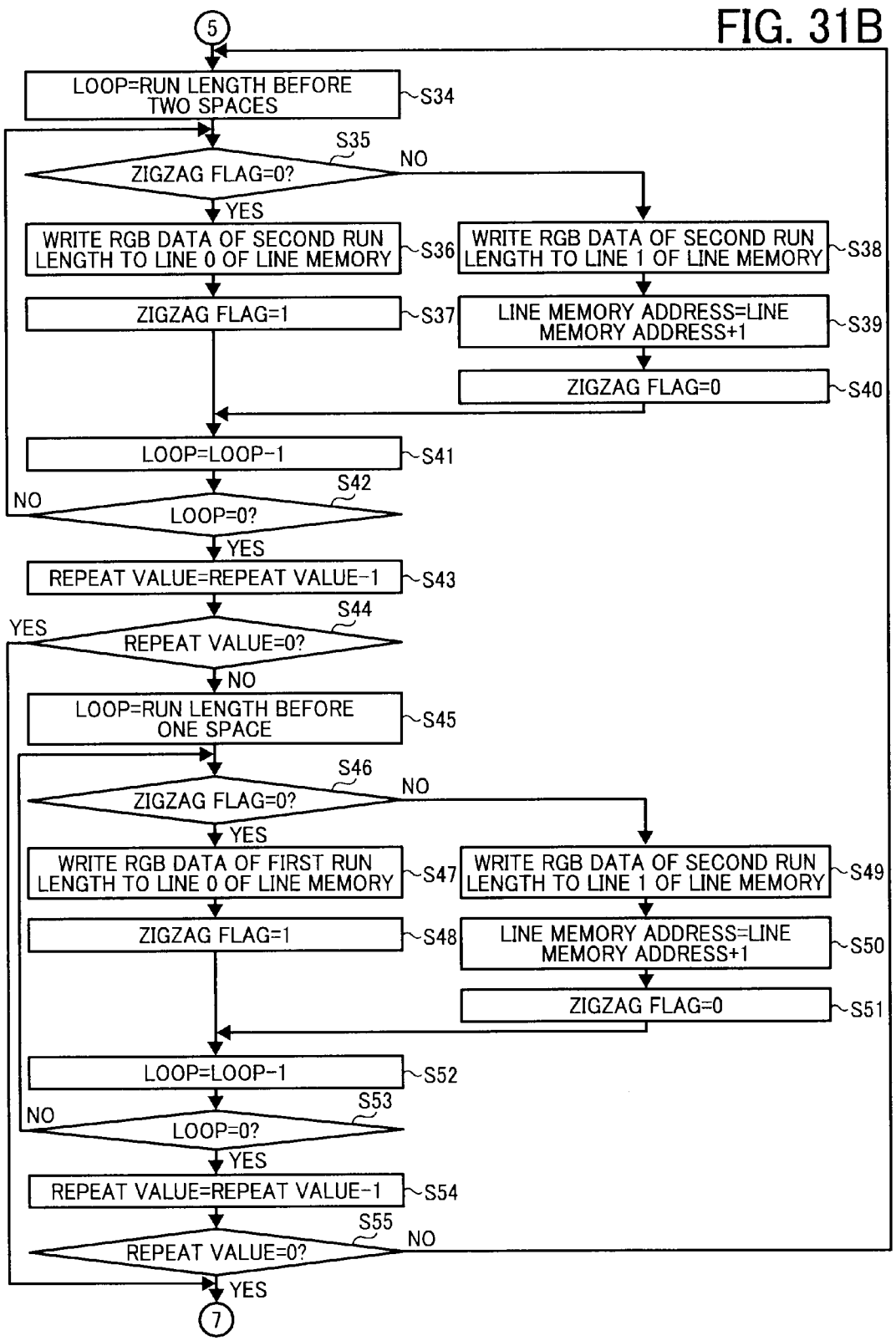

DEVICE AND METHOD FOR ENCODING IMAGE DATA

CROSS-REFERENCE TO RELATED APPLICATIONS

The present application claims priority to and incorporates by reference the entire contents of Japanese priority document 2007-225088 filed in Japan on Aug. 31, 2007.

BACKGROUND OF THE INVENTION

1. Field of the Invention

The present invention relates to a device and a method for encoding multivalue image data.

2. Description of the Related Art

Recently, personal computers (hereinafter, "PC"), digital cameras etc. are widely available in general market. Due to this, color images such as color photographs, color pictures that are mainly graphics are increasingly output using an image forming apparatus. In the image forming apparatus such as a printer, image data that is transmitted from a PC is stored in a temporary memory to form an image. However, compared to binary image data that expresses a black and white image, a significantly large capacity is necessitated for multivalue image data that expresses a color image. Due to this, a memory of a large capacity needs to be mounted in the image forming apparatus for processing a large amount of the multivalue image data without putting on hold a transmission from the external device such as the PC, thus increasing the cost. Thus, it is desirable to reduce a memory capacity by ensuring that a plurality of the multivalue image data, which are sequentially transmitted from the external device, are stored in the temporary memory while being compressed by encoding, and ensuring that the stored encoded multivalue image data are sequentially decoded at the time of an image forming process.

In a method that is well known as a method to encode the image data, the multivalue image data is converted into a frequency component by using an orthogonal transformation such as discreet cosine transform (DCT) and a conversion coefficient is quantized. For example, joint photographic experts group (JPEG), which is standardized by International Telecommunications Union-Telecommunications Standardization Division (IUT-T) and International Organization for Standardization (ISO), is also one of the methods to encode the image data.

However, in the method that quantizes the conversion coefficient of the frequency component of the image data, eliminating a high frequency component results in irreversible compressed image data that includes image deterioration such as mosquito noise. The image deterioration noticeably occurs in the color image such as the graphics that include a sharp hue change. Due to this, the multivalue image data, which mainly includes the graphics, cannot be compressed to an image quality that is the same or nearly the same as the image quality of the original image.

A run length method is known as another method for encoding the image data. In the run length method, in a pixel column formed of a plurality of pixels, an isochromatic continuous pixel cluster, which includes multiple pixels that continue isochromatically with respect to each other, is converted into a code that indicates a run and a length of the isochromatic continuous pixel cluster. For example, in the pixel column of the binary image data, if the pixels are aligned in a sequence of "black, black, black, black, black, black, black, white, white, white, black, white, white, white, white", the pixel cluster is substituted by a code "7314". Because the binary image data includes only the two colors of black and white, by deciding a color that is treated as an initial run and using a number that indicates the run length, the pixel column can be expressed. For example, the code "7314" indicates the pixel column in which black is prior decided to be treated as the initial run. If white is prior decided to be treated as the initial run, the pixel column can be expressed as "07314". However, in the multivalue image data, apart from run data that indicates the respective run length of each run, color data is also necessitated that indicates the respective color data of each run.

A capacity of the image data can be significantly compressed by using the run length method for the image that includes a large number of pixels of the same color or the image that includes a large number of white spaces. Further, irreversible compressed image data can be obtained that does not differ from the original image. A method which is disclosed in Japanese Patent Application Laid-open No. 2005-27081 is known as an image data encoding method that incorporates the run length method.

However, when using the run length method to encode the multivalue image data, which mainly includes the graphics that include abundant hue change, a data capacity after encoding cannot be significantly reduced compared to an original data capacity. The drawback is due to the following two reasons.

Firstly, in the multivalue image data that includes abundant hue change, a run does not continue for long. To be specific, in most of the recent data processing units such as computers, the color image is expressed as a full color image. In the full color image, brightness of the three primary colors of red (R), green (G), and blue (B) (or yellow (Y), magenta (M), and cyan (C)) is divided into 256 grayscales respectively. Thus, a total of 16777216 types of colors can be expressed. If the multivalue image data, which includes abundant hue change, is subjected to such a full color expression, even a marginal difference of color that is nearly invisible causes the run to end. Due to this, a number of runs that are included in run data after encoding become extremely large, thus hampering a reduction of the data capacity.

Secondly, in the data capacity after encoding, a percentage occupied by the color data mentioned earlier increases. For example, in the full color expression of 16777216 colors, because eight bits are needed for notation of R, G, and B (or Y, M, and C) respectively, one color necessitates a data capacity of 24 bits. Arranging such a data capacity corresponding to each individual run hampers a reduction of the data capacity.

SUMMARY OF THE INVENTION

It is an object of the present invention to at least partially solve the problems in the conventional technology.

According to an aspect of the present invention, there is provided an image-data encoding device that encodes multivalue image data. The image-data encoding device includes a reading unit that reads image data; a re-reading unit that re-reads the image data read by the reading unit by performing, in a pixel matrix consisting of a plurality of pixels of the image data read by the reading unit, a process of scanning pixels in a partition in which at least two pixels are respectively aligned in a column direction and in a row direction in a predetermined order in a predetermined alignment sequence of partitions; and a multivalue run length-encoding unit that encodes the image data re-read by the re-reading unit to multivalue run length data indicating at least color data and run lengths of the color data.

Furthermore, according to another aspect of the present invention, there is provided an image-data encoding method of encoding multivalue image data. The image-data encoding method includes reading image data; re-reading the image data read at the reading by performing, in a pixel matrix consisting of a plurality of pixels of the image data read at the reading, a process of scanning pixels in a partition in which at least two pixels are respectively aligned in a column direction and in a row direction in a predetermined order in a predetermined alignment sequence of partitions; and encoding the image data re-read at the re-reading to multivalue run length data indicating at least color data and run lengths of the color data.

Moreover, according to still another aspect of the present invention, there is provided an image-data encoding device that encodes multivalue image data. The image-data encoding device includes a dictionary-data storing unit that stores therein dictionary data in which color data is associated with an index value that is index data of the color data; a multivalue run length-encoding unit that encodes image data to multivalue run length data indicating at least color data and run length of the color data; and a color-data encoding unit that encodes the color data in each individual run of the multivalue run length data to the index value based on the dictionary data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of an electrical portion in the printer along with an external device in the form of a personal computer (PC);

FIG. 3 is a block diagram of a flow of image data in the electrical portion shown in FIG. 2;

FIG. 4 is a flowchart of a data process that is executed by an encoding device of the electrical portion;

FIG. 6 is a schematic diagram for explaining data scanning in a horizontal line direction;

FIG. 7 is a schematic diagram for explaining data scanning in a zigzag direction;

FIG. 8 is a schematic diagram for explaining scanning of RGB band data in the zigzag direction;

FIGS. 31A and 31B are flowcharts of a continuation of the data process that is shown in FIG. 30.

DETAILED DESCRIPTION OF THE PREFERRED EMBODIMENTS

Exemplary embodiments of the present invention are explained in detail below with reference to the accompanying drawings. In an embodiment explained below, the present invention is applied to a full color printer (hereinafter, simply "printer") that is an electronographic image forming apparatus.

Figure 1:
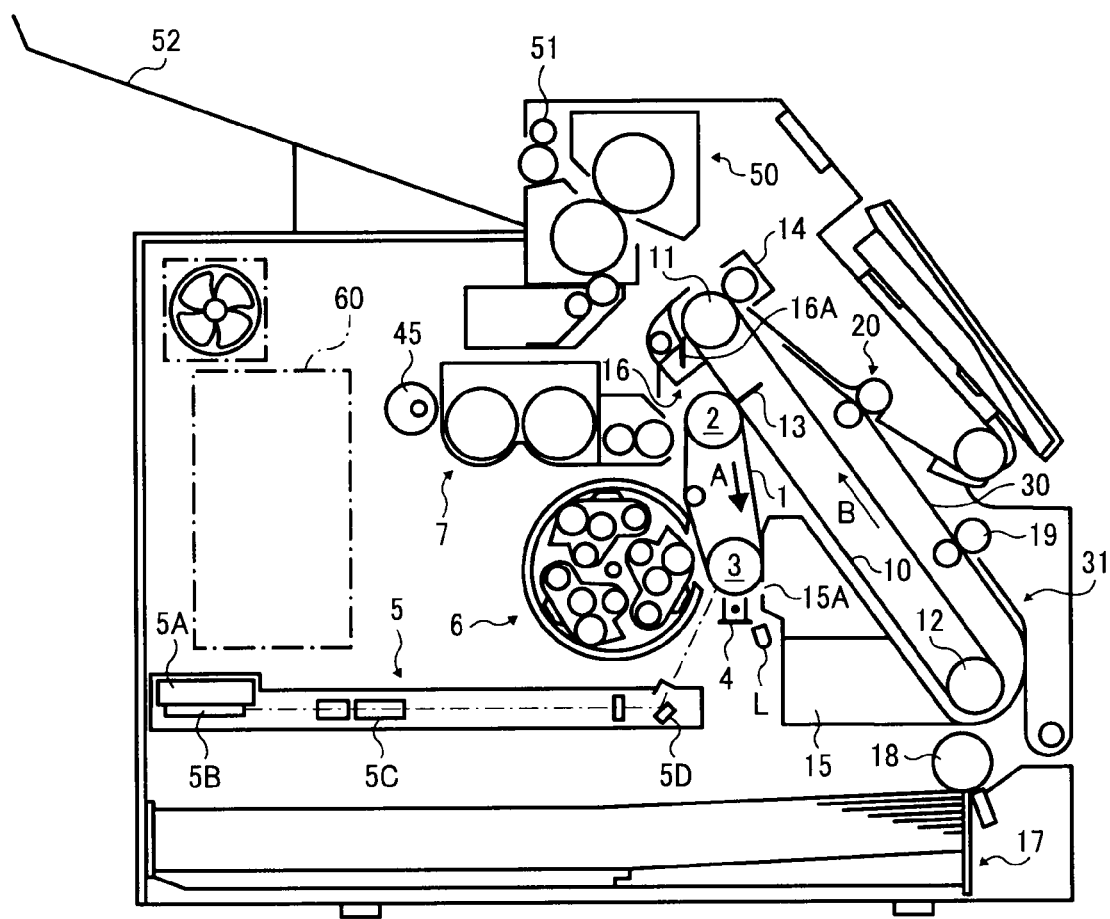
FIG. 1 is a schematic diagram of an overview of a printer according to an embodiment of the present invention.

A basic structure of the printer according to the embodiment is explained first. FIG. 1 is a schematic diagram of an overview of the printer according to the embodiment. As shown in FIG. 1, a photosensitive element 1, which is an endless-belt-type image carrying member, is stretched such that the photosensitive element 1 can endlessly move in a clockwise direction due to rotating rollers 2 and 3. The photosensitive element 1 endlessly moves in the same direction when any one of the rotating rollers 2 and 3 is rotatably driven.

A charging unit 4, a neutralizing lamp L, and a cleaning unit 16 are arranged around the photosensitive element 1. The charging unit 4 uniformly charges a surface of the photosensitive element 1. The neutralizing lamp L neutralizes the photosensitive element 1. The cleaning unit 16 cleans a later explained transfer residual toner that is adhering to the surface of the photosensitive element 1.

An optical writing unit 5, which is a latent image writing unit, carries out optical scanning using a laser beam on the photosensitive element 1 at a downstream side, in a belt moving direction, than a uniform charging position by the charging unit 4. Due to the optical scanning, an electric potential of an exposed portion of the photosensitive element 1 decreases, thus forming an electrostatic latent image on the photosensitive element 1.

A rotating-type developing unit 6 is arranged on the left side of the photosensitive element 1 that is stretched in a vertically long position and that occupies space in a perpendicular direction than in a horizontal direction. The rotating-type developing unit 6 holds, in a holding unit that can rotate centered on a rotation axis, a C developing unit that uses a C toner, an M developing unit that uses an M toner, and a Y developing unit that uses a Y toner at positions that cause a phase lag of a rotation angle of 120° between the C developing unit, the M developing unit, and the Y developing unit. Rotation of the holding unit causes any one of the developing units to move to a developing position opposite the photosensitive element 1, thus enabling to switch a developing color of the electrostatic latent image on the photosensitive element 1 by C, M, and Y. The developing units, which contribute to developing, are sequentially switched, thus enabling to form a C toner image, an M toner image, and a Y toner image on the photosensitive element 1. Further, rotating the holding unit to a position such that none of the developing units is positioned at the developing position also enables to halt the developing by the rotating-type developing unit 6.

A black (Bk) developing unit 7, which uses black toner, is arranged in the upper direction of the rotating-type developing unit 6. The Bk developing unit 7 develops the electrostatic latent image on the photosensitive element 1 in black color, thus enabling to obtain a black toner image. Due to a biasing unit such as a spring, which biases the Bk developing unit 7 in a direction away from the photosensitive element 1, and an end of a cam surface of a rotatable cam 45, the Bk developing unit 7 can reciprocate between a position where the electrostatic latent image on the photosensitive element 1 can be developed and a position where the electrostatic latent image cannot be developed.

Based on image data, the optical writing unit 5 causes the laser beam, which is emitted from an optical source such as a not shown semiconductor laser, to be reflected by a mirror surface that is on a side surface of a regular polygonal column shaped polygon mirror 5B that is rotatably driven by a polygon motor 5A, thus causing the laser beam to slant in a main scanning direction (a direction corresponding to a photosensitive element axial direction). Next, the laser beam reaches a surface of the photosensitive element 1 via an fθ lens 5C and a reflecting mirror 5D, thus optically scanning the surface of the photosensitive element 1.

As shown in FIG. 1, a transfer unit is arranged on the right side of the photosensitive element 1. The transfer unit includes an endless intermediate transfer belt 10 that is stretched on rotating rollers 11 and 12 and that endlessly moves in a counterclockwise direction due to rotatable driving of any one of the rotating rollers. The transfer unit causes a front surface of the intermediate transfer belt 10 to touch a front surface of the photosensitive element 1, thus forming a primary transfer nip, and causes a first transfer unit such as a transferring brush to touch or to proximally move towards an intermediate transfer belt area on the backside of the primary transfer nip. The first transfer unit forms inside the primary transfer nip, a first transfer electric field that causes the toner of the toner image on the photosensitive element 1 to electrostatically move from the photosensitive element 1 to the intermediate transfer belt 10. Due to the first transfer electric field and a nip pressure, the toner image on the photosensitive element 1 is primary transferred onto the intermediate transfer belt 10.

First, a C electrostatic latent image is formed on the surface of the photosensitive element 1 due to the optical scanning by the optical writing unit 5. The C electrostatic latent image is developed by the C developing unit of the rotating-type developing unit 6 and becomes the C toner image. During formation of the C toner image, the Bk developing unit 7 retracts at the position where developing cannot be carried out. The C toner image, which is developed on the photosensitive element 1, is primary transferred by the primary transfer nip onto the intermediate transfer belt 10.

When the optical scanning for forming the C electrostatic latent image is completed, writing of the M electrostatic latent image due to the optical scanning by the optical writing unit 5 starts. After a rear end of the C electrostatic latent image on the photosensitive element 1 has passed a position opposite the rotating-type developing unit 6, the holding unit of the rotating-type developing unit 6 is rotated through approximately 120° until a front end of the M electrostatic latent image on the photosensitive element 1 enters the same opposite position. Due to this, the M developing unit of the rotating-type developing unit 6 moves to the developing position and the M electrostatic latent image can be developed using the M toner. In the primary transfer nip, The M toner image, which is developed on the photosensitive element 1, is overlapped on the C toner image on the intermediate transfer belt 10 and is primary transferred.

When the optical scanning for forming the M electrostatic latent image is completed, writing of the Y electrostatic latent image due to the optical scanning by the optical writing unit 5 starts. After a rear end of the M electrostatic latent image on the photosensitive element 1 has passed the position opposite the rotating-type developing unit 6, the holding unit of the rotating-type developing unit 6 is rotated through approximately 120° until a front end of the Y electrostatic latent image on the photosensitive element 1 enters the same opposite position. Due to this, the Y developing unit of the rotating-type developing unit 6 moves to the developing position and the Y electrostatic latent image can be developed using the Y toner. In the primary transfer nip, The Y toner image, which is developed on the photosensitive element 1, is overlapped on the C and M toner images on the intermediate transfer belt 10 and is primary transferred.

Although the black color can be reproduced by overlapping C, M, and Y colors, in the printer according to the embodiment, the black color having a high output frequency is reproduced using the black toner without using overlapping. Due to this, when the optical scanning for forming the Y electrostatic latent image is completed, writing of the K electrostatic latent image starts using the optical scanning by the optical writing unit 5. After the rear end of the Y electrostatic latent image on the photosensitive element 1 has passed the position opposite the rotating-type developing unit 6, the holding unit of the rotating-type developing unit 6 is rotated through approximately 60° until the front end of the K electrostatic latent image enters the same opposite position. Nearly simultaneously, rotation of the cam 45 causes the Bk developing unit 7 to move to the position where developing can be carried out. Due to this, a developing process by the rotating-type developing unit 6 stops and developing by the Bk developing unit 7 is enabled. In the primary transfer nip, a Bk toner image, which is developed on the photosensitive element 1, is overlapped on the C, M, and Y toner images on the intermediate transfer belt 10 and is primary transferred.

The transfer unit includes, on the outer side of a loop of the intermediate transfer belt 10, a second transfer unit 14 that includes a second transferring roller etc. The second transfer unit 14 is arranged such that the second transfer unit 14 touches or moves proximally to a stretched turning portion with respect to the rotating roller 11 in the intermediate transfer belt 10, thus forming a secondary transfer position. Due to this, a second transfer electric field, which causes a four color overlapped toner image on the intermediate transfer belt 10 to electrostatically move from the intermediate transfer belt 10 to the second transfer unit 14, is formed in the secondary transfer position.

A sheet feeding cassette 17 is arranged at the bottommost portion of the printer. The sheet feeding cassette 17 stores therein recording sheets in the form of a sheet bundle that includes a plurality of sheets piled together. The topmost recording sheet is transmitted to a sheet feeding path 31 due to rotatable driving of a sheet feeding roller 18. The transmitted recording sheet is transported while being sandwiched in a transportation nip that is formed by a pair of transporting rollers 19 that are arranged in the sheet feeding path 31, thus reaching a pair of registration rollers 20 that are arranged in the vicinity of an end portion of the sheet feeding path 31. Upon a front end of the recording sheet entering a resist nip that is formed by the pair of the registration rollers 20, rotatable driving of both the registration rollers 20 temporarily stops. Next, rotatable driving of both the registration rollers 20 is resumed at a timing that enables to overlap the recording sheet on the four color overlapped toner image on the intermediate transfer belt 10, and the recording sheet is transmitted towards the secondary transfer position.

Due to the secondary transfer electric field, the four color overlapped toner image is bulk secondary transferred onto the recording sheet that is adhering to the four color overlapped toner image on the intermediate transfer belt 10 at the secondary transfer nip.

The transfer residual toner, which is not secondary transferred on the recording sheet, is adhering to the intermediate transfer belt 10 after a secondary transferring process. The cleaning unit 16, which causes a cleaning blade 16A to touch the intermediate transfer belt 10 at the downstream side than the secondary transfer position in the belt moving direction, removes the transfer residual toner.

In a primary transferring process of overlap, the intermediate transfer belt 10 is run until at least four rotations to form a four color toner image on the intermediate transfer belt 10. During the primary transferring process, if the cleaning blade 16A continues to touch the intermediate transfer belt 10, the toner images of the respective colors that are primary transferred onto the intermediate transfer belt 10 are removed from the belt surface by the cleaning blade 16A, and the four color overlapped toner image cannot be obtained. To overcome the drawback, the printer according to the embodiment includes a contact/separating mechanism that causes the cleaning blade 16A to move to a cleaning position that causes the cleaning blade 16A to touch the intermediate transfer belt 10 and to a retracting position that separates the cleaning blade 16A from the intermediate transfer belt 10. During the primary transferring process of overlap, the contact/separating mechanism causes the cleaning blade 16A to retract to the retracting position. If a unit, which touches the intermediate transfer belt 10 to form the secondary transfer nip, is to be used as the second transfer unit 14, a contact/separating mechanism is also necessitated that separates the second transfer unit 14 from the intermediate transfer belt 10 during the primary transferring process to prevent a transfer of the toner images from the intermediate transfer belt 10 to the second transfer unit 14.

Due to the bulk secondary transfer of the four color overlapped toner image at the secondary transfer position, the full color image is formed on the recording sheet. After the recording sheet is transmitted to a fixing unit 50 and the full color image is fixed on the recording sheet, the recording sheet is ejected outside the printer via an ejection nip that is formed by a pair of ejecting rollers 51. Next, the recording sheet is stacked on a stacking unit 52 that is formed on an outer portion of a chassis of the printer.

The transfer residual toner, which is scraped from the surface of the intermediate transfer belt 10 by the cleaning unit 16, is dropped into a collecting chamber 15 that is arranged in a lower direction in a gravitational force direction than the cleaning unit 16.

FIG. 2 is a block diagram of an electrical portion in the printer along with an external device in the form of a personal computer (PC). FIG. 3 is a block diagram of a flow of the image data in the electrical portion shown in FIG. 2. As shown in FIG. 2, the electrical portion of the printer according to the embodiment includes a communication processing unit 101, a main memory 102, a central processing unit (CPU) 103, an encoding device 110 that is an image data encoding device, a decoding device 140 that is an image data decoding unit, a color processing unit 170, an engine control unit 180, and a printer engine 190.

The communication processing unit 101 communicates with an external PC via a network cable, a printer cable, or a wireless local area network (LAN). Page description language (PDL) data is transmitted to the communication processing unit 101 from the PC as the multivalue image data. The PDL data, which is received by the communication processing unit 101, is temporarily stored in a PDL data-memory area 102b of the main memory 102 and transmitted to the CPU 103.

The CPU 103 divides the PDL data, which is transmitted from the PDL data-memory area 102b, for each predetermined page area and transmits obtained RGB band data to an RGB band data-memory area 102c of the main memory 102. The RGB band data are sequentially transmitted to the encoding device 110, subjected to an encoding process, collected according to each page, and transmitted to an encoded page-memory area 102d of the main memory 102.

The pagewise encoded page data, which are temporarily stored in the encoded page-memory area 102d, are subjected to a decoding process by the decoding device 140, returned to pagewise RGB data, and transmitted to the color processing unit 170.

As shown in FIG. 3, the color processing unit 170 includes an RGB to CMY-color conversion processing unit 171, an under cover removal (UCR) processing unit 172, a grayscale processing unit 173 etc. Color data of the RGB data, which is transmitted from the decoding device 140 to the color processing unit 170, is converted from an RGB system to a CMY system by the RGB to CMY-color conversion processing unit 171. After the UCR processing unit 172 has executed an undercolor removing process for reducing adhered amounts of the C, M, and Y toners in Bk pixels of the image, the grayscale processing unit 173 executes a grayscale process. Next, the RGB data is transmitted from the color processing unit 170 to the printer engine 190 via the engine control unit 180. Based on the pagewise image data, which is transmitted from the engine control unit 180, the printer engine 190 controls driving of the optical writing unit 5, the photosensitive element 1, various types of developing units, and the intermediate transfer belt 10.

A structure, which is a salient feature of the printer according to the embodiment, is explained next.

FIG. 4 is a flowchart of a data process that is executed by the encoding device 110. First, the encoding device 110 executes a reading process (step a, hereinafter step will be indicates by "S") for reading the RGB band data that is stored in the RGB band data-memory area 102c of the main memory 102. After executing a multivalue run length encoding process (Sb) for encoding the read RGB band data to multivalue run length data, the encoding device 110 executes a repeated encoding process (Sc). In the repeated encoding process, the encoding device 110 detects a regular repetition of a run that is isochromatic and of the same length, and executes a process for repeatedly encoding to repeated data, the RGB data (color data) and a run length data of the run that appears repeatedly. Next, the encoding device 110 executes a color data encoding process (Sd) for encoding the RGB data of each run in the multivalue run length data to index data, and executes a code format generating process (Se) for generating a format of the code. Further, after executing a code writing process (Sf) for temporarily writing to a storage area, the codes of the multiple RGB band data, the encoding device 110 collects the codes in a predetermined number and outputs the codes as encoded page data.

Figure 5:
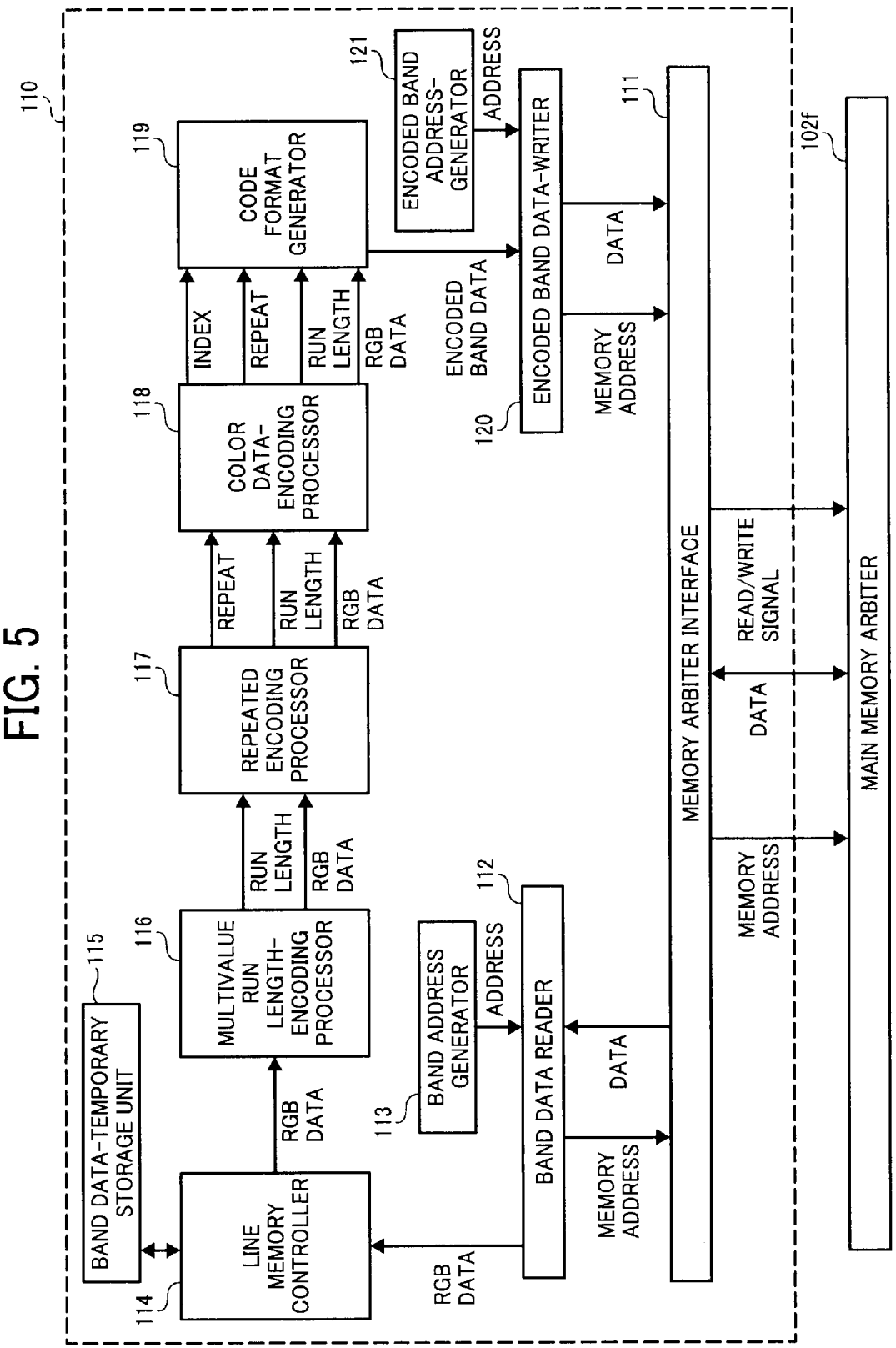
FIG. 5 is an internal block diagram of the encoding device.

FIG. 5 is an internal block diagram of the encoding device 110. As shown in FIG. 5, the encoding device 110 includes a memory arbiter interface 111 that is a data storing unit, a band data reading unit 112, a band address generating unit 113, a line memory control unit 114, a band data-temporary storing unit 115, a multivalue run length-encoding processing unit 116, a repeated encoding processing unit 117 that is a repeated encoding device, a color data-encoding processing unit 118 that is a color-data encoding unit, a code format generating unit 119, an encoded band data-writing unit 120, and an encoded band address generating unit 121.

The band data reading unit 112, which is a reading unit, executes as a first half process in an image reading process shown in FIG. 4, a process to read the RGB band data that are stored in the RGB band data-memory area 102c of the main memory 102. To be specific, as shown in FIG. 2, the PDL data of one page, which is transmitted from the PC to the electric portion of the printer according to the embodiment, is RGB portrayed for each band unit by the CPU 103 and becomes the multiple RGB band data. The RGB band data are stored in the RGB band data-memory area 102c of the main memory 102. The band data reading unit 112, which is shown in FIG. 5, sequentially reads the RGB band data from a head portion.

The CPU 103 analyzes the PDL data that is transmitted from the PC and portrays RGB bands. Data of each pixel in the RGB band data, which are stored in the RGB band data-memory area 102c, is stored in the sequence mentioned earlier. Due to reasons related to hardware, the data of each pixel in the RGB band data inside the RGB band data-memory area 102c cannot be read using any sequence that differs from the sequence mentioned earlier. Due to this, the band data reading unit 112 shown in FIG. 5 reads the RGB band data in the sequence mentioned earlier. Thus, the data of each pixel of the RGB bands is read only for a predetermined number of horizontal lines. For example, as shown in FIG. 6, the band data reading unit 112 reads the data of each pixel in the sequence that starts from a front end pixel in a line 0 that indicates a horizontal line of the number 0 and proceeds to a back end pixel of the line 0, a front end pixel in a line 1 that indicates a horizontal line of the number 1, and to a back end pixel of the line 1.

A code assigned inside each pixel shown in FIG. 6 indicates a color of the pixel and the pixels that are assigned the same code are mutually isochromatic. In an existing encoding device, a run length of each run in the run length is determined by a reading sequence that is indicated by the arrow shown in FIG. 6. Thus, in the example shown in FIG. 6, the run length becomes "3, 3, 4, 3, 1, 2, . . . , 2, 4, 4, 3, 1, 2". Further, the color data becomes "Ca, Cb, Cc, Cb, Cd, Cc, . . . , Ca, Cb, Cc, Cb, Cd, Cc".

In the encoding device 110 of the printer according to the embodiment, after temporarily storing the RGB band data that are read in the sequence shown in FIG. 6, the run length is generated while rereading the RGB band data in a different sequence. The process mentioned earlier becomes a second half process in the image reading process (Sa) shown in FIG. 4, and the process is executed by the line memory control unit 114 and the band data-temporary storing unit 115 that are shown in FIG. 5. In other words, in the printer according to the embodiment, the line memory control unit 114 and the band data-temporary storing unit 115 function as re-reading units.

Figure 9:
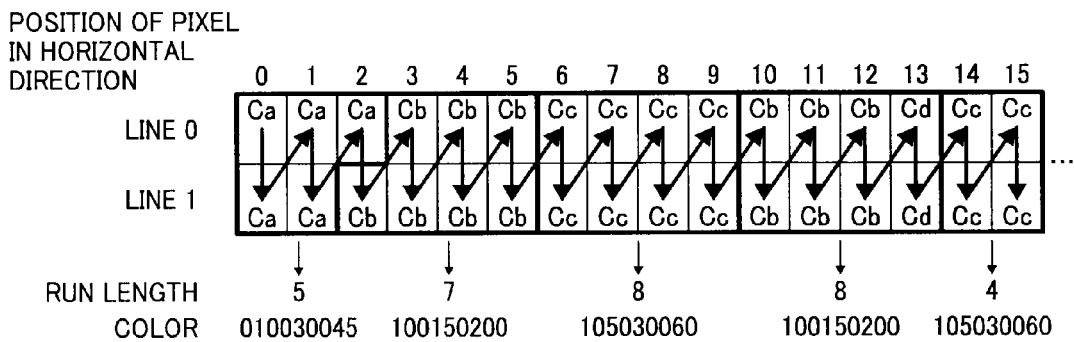
FIG. 9 is a schematic diagram for explaining a relation between the RGB band data that is scanned in the zigzag direction and multivalue run length data that corresponds to the RGB band data.

In a re-reading process carried out by the re-reading units, in a pixel matrix of the read RGB band data, the re-reading units carry out, in an alignment sequence of predetermined compartments, a process to scan in a predetermined sequence, the pixels inside the compartments in which two or more pixels are arranged in a vertical direction and in a horizontal direction, thus re-reading the data of each pixel in the RGB band data. For example, the re-reading units can carry out scanning in a zigzag direction that is shown in FIGS. 7 and 8. As shown in FIGS. 7 and 8, after reading, from the RGB band data, the data of the pixels of two-lines in a horizontal line direction, the re-reading units carry out scanning in the zigzag direction that is indicated by the arrow shown in FIGS. 7 and 8, thus proceeding from the pixel in the first column of the line 0, the pixel in the first column of the line 1, the pixel in the second column of the line 0, the pixel in the second column of the line 1 and so on. Due to this, a matrix compartment area of two vertical pixels and two horizontal pixels is scanned from the first column towards the last column. Thus, as shown in FIG. 9, the run length becomes "5, 7, 8, 8, 4, . . . ". Due to this, the run length of each run increases by nearly twofold compared to the run length in the existing encoding device and a number of runs can be reduced by nearly half. If the number of runs is reduced by half, because a data capacity of the color data corresponding to each run can be reduced by half, a significant economization of a memory capacity can be expected.

The multivalue run length-encoding processing unit 116 shown in FIG. 5 carries out encoding from the RGB data of each re-read pixel to the multivalue run length data.

Further, as shown in FIG. 9, in data of the color data that is expressed by a nine digit number, three digits from the left, the next three digits, and the next three digits respectively indicate luminosities of R, G, and B in 256 levels from 000 to 255.

An example of re-reading the RGB band data while scanning in the zigzag direction is explained earlier. However, in the pixel matrix, the scanning can also be carried out in a different direction than the zigzag direction if the re-reading units carry out the process to scan in the predetermined sequence, the pixels inside the compartments in which two or more pixels are arranged in the vertical direction and in the horizontal direction, in the alignment sequence of the predetermined compartments. For example, the re-reading units can also scan in a direction that proceeds from the pixel in the first column of the line 0, the pixel in the second column of the line 0, the pixel in the first column of the line 1, the pixel in the second column of the line 1, the pixel in the third column of the line 0 and so on. Further, the re-reading units can also scan in a serpentine direction that proceeds from the pixel in the first column of the line 0, the first column of the line 1, the pixel in the second column of the line 1, the pixel in the second column of the line 0, the pixel in the third column of the line 0 and so on.

Figure 10:
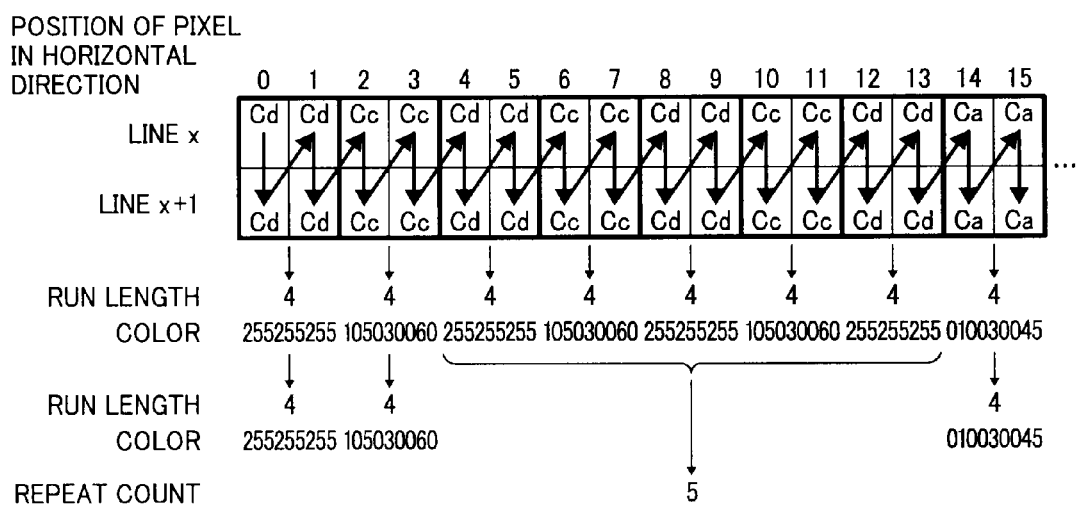
FIG. 10 is a schematic diagram for explaining a relation between the RGB band data in a repeated encoding process and repeat data corresponding to the RGB band data.

The repeated encoding processing unit 117 carries out the repeated encoding process (Sc of FIG. 4) on the multivalue run length data that is obtained by the multivalue run length-encoding processing unit 116. In the repeated encoding process, the repeated encoding processing unit 117 detects the regular repetition of the run that is isochromatic and of the same length, and encodes to the repeated data, the run that repeatedly appears. For example, the first to the ninth runs in a multivalue run length are shown in FIG. 10. In the multi-value run length, the first run is a run of Cd color that includes four pixel blocks of a run length 4. The second run is a run of Cc color that includes four pixel blocks of the run length 4. The third, the fifth, and the seventh runs are isochromatic and are of the same length as the first run. The fourth, the fifth, and the eighth runs are isochromatic and of the same length as the second run. Due to this, in patterns of the third to the eighth runs in the multivalue run length, the first run and the second run are alternately repeated five times. Thus, data of the run length and the color data in the third to the eighth runs are encoded to the repeated data that indicates a repetition of five times, thus enabling to further reduce the memory capacity.

The color data-encoding processing unit 118 shown in FIG. 5 executes the color data encoding process (Sd of FIG. 4) on the multivalue run length data that is subjected to the repeated encoding process. To be specific, the electric portion of the printer according to the embodiment includes a not shown dictionary data-storage circuit as a dictionary-data storing unit. The dictionary data-storage circuit stores therein dictionary data in which a correspondence is established between the color data and an index value that is an index data of the color data. The color data-encoding processing unit 118 encodes the color data in each run of the multivalue run length data to the index value that corresponds to the respective color in the respective dictionary data. Due to this, the nine digit color data, which necessitates the data capacity of 24 bits for each color, is encoded to the index value that needs less than half the data capacity. Thus, the memory capacity can be reduced even further.

Codes such as the run length, the repeated data, the index value etc. of the multivalue run length data, which is subjected to the color data encoding process, are further encoded to a predetermined bit format by the code format generating unit 119 that is shown in FIG. 5, and the multivalue run length data is output to the memory arbiter interface 111 via the encoded band data-writing unit 120. Next, the multivalue run length data is output as pagewise encoded page data to a main memory arbiter 102*f* of the main memory 102.

Figure 11:
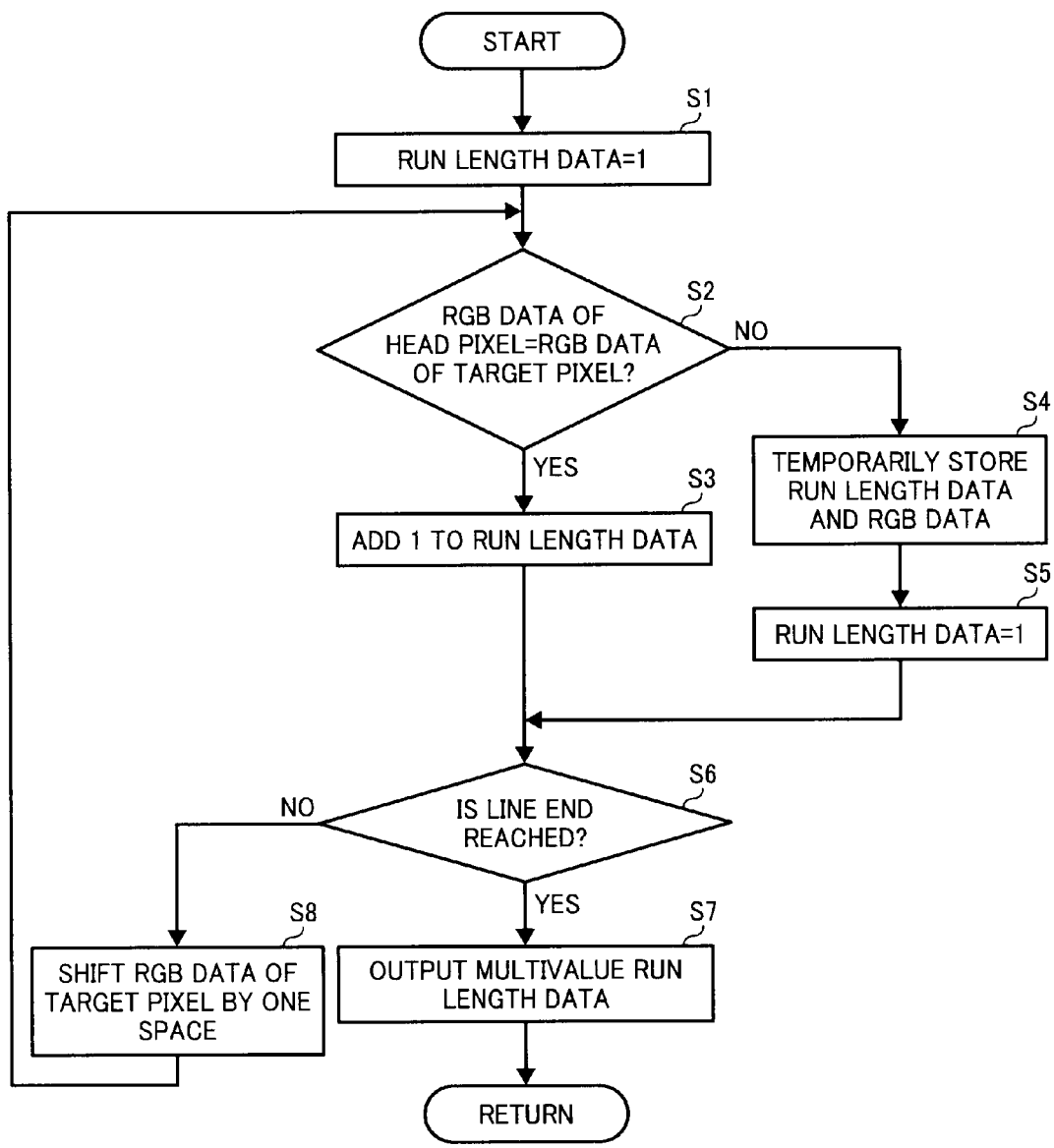
FIG. 11 is a flowchart of a data process that is executed by a multivalue run length-encoding processing unit of the encoding device.

FIG. 11 is a flowchart of a data process that is executed by the multivalue run length-encoding processing unit 116. In the data process, after setting an initial value of the run length data to "1" (Step S1), the multivalue run length-encoding processing unit 116 sequentially determines whether the RGB data of a head pixel of the run, in the RGB data of each pixel that is re-read by the re-reading units, matches with the RGB data of a target pixel that is at the rear end of the run than the head pixel (Step S2). If the RGB data of the head pixel matches with the RGB data of the target pixel (Yes at Step S2), "1" is added to the run length data (Step S3). If the RGB data of the head pixel does not match with the RGB data of the target pixel (No at Step S2), after storing the run length data and the corresponding RGB data (the RGB data of the head pixel) in the temporary storage area (Step S4), the multivalue run length-encoding processing unit 116 initializes the run length data to "1" (Step S5). After the process at step S3 or step S5, the multivalue run length-encoding processing unit 116 determines whether a line end is reached (Step S6). If the line end is reached (Yes at Step S6), the multivalue run length-encoding processing unit 116 outputs the multivalue run length data, which includes the multiple run length data and the RGB data that are stored in the temporary storage area, for the next process (Step S7) and a string of the process flow is returned. Further, if the line end is not reached (No at Step S6), the multivalue run length-encoding processing unit 116 shifts the RGB data of the target pixel by one space towards a rear end of the run (Step S8) and re-executes the determining process at step S2. The multivalue run length-encoding processing unit 116 includes an application specific integrated circuit (ASIC) for executing the string of the process flow mentioned earlier using hardware.

Figure 12:
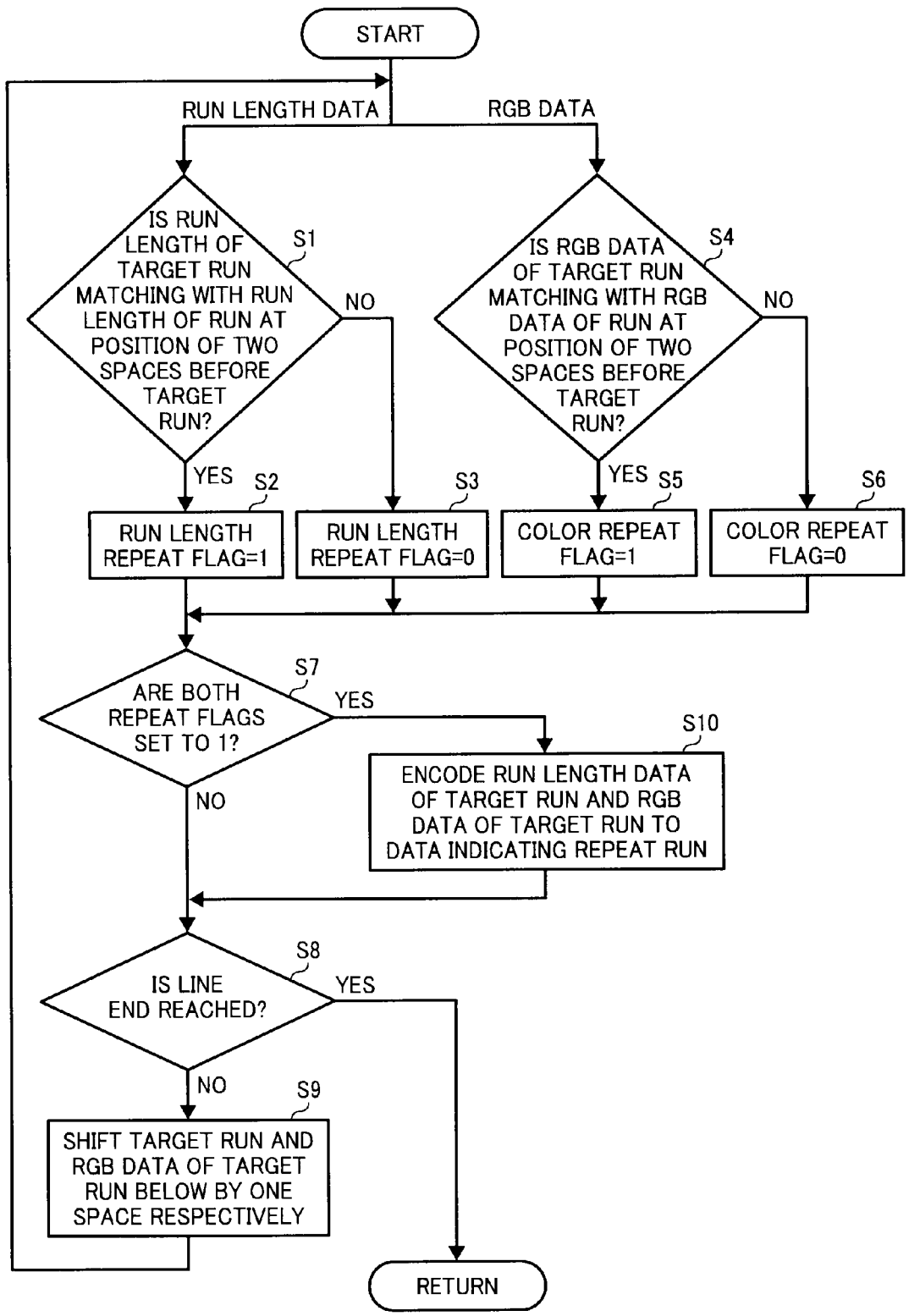
FIG. 12 is a flowchart of a data process that is executed by a repeated encoding processing unit of the encoding device.

FIG. 12 is a flowchart of a data process that is carried out by the repeated encoding processing unit 117. In the data process, the repeated encoding processing unit 117 parallely processes the run length data that indicates the run length of the individual run in the multivalue run length data and an RGB data string that indicates the RGB data of the individual run. The run length data is used in a determining process (Step S1) to determine whether a target run included in the run length data matches with a run that is at a position of two spaces before the target run. If the run lengths are matching (Yes at Step S1), a run length repeat flag is set to 1 (Step S2). If the run lengths are not matching (No at Step S1), the run length repeat flag is set to 0 (Step S3). The RGB data string is used in a determining process (Step S4) to determine whether the RGB data of the target run included in the RGB data string matches with the RGB data of the run that is at the position of two spaces before the target run. If the RGB data are matching (Yes at Step S4), a color repeat flag is set to 1 (Step S5). If the RGB data are not matching (No at Step S4), the color repeat flag is set to 0 (Step S6).

Upon completion of parallel processes at steps S1 to S3 and at steps S4 to S6, the repeated encoding processing unit 117 determines whether both the run length repeat flag and the color repeat flag are set to 1 (Step S7). Upon determining that at least any one of the run length repeat flag and the color repeat flag is not set to 1 (no at Step S7), the repeated encoding processing unit 117 determines whether the line end is reached, and if the line end is reached (Yes at Step S8), a string of the process flow is returned. If the line end is not reached (No at Step S8), the repeated encoding processing unit 117 shifts below, the target run and the RGB data of the target run by one space respectively (Step S9), and once again executes the parallel processes mentioned earlier.

In the determining process at step S7, upon determining that both the run length repeat flag and the color repeat flag are set to 1 (Yes at Step S7), the repeated encoding processing unit 117 encodes the run length data of the target run and the RGB data corresponding to the target run to data that indicates a repeat run (Step S10). After the processes at steps S8 and S9, the repeated encoding processing unit 117 once again executes the parallel processes mentioned earlier. The repeated encoding processing unit 117 includes the ASIC for executing the string of the process flow mentioned earlier using hardware.

Figure 13:
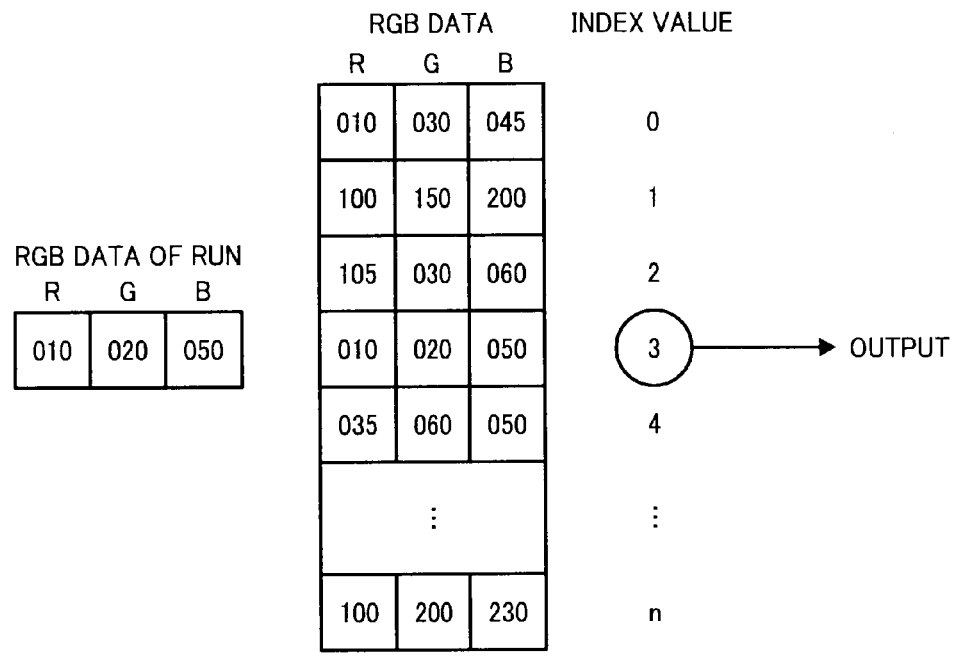
FIG. 13 is a schematic diagram of an overview of dictionary data that is stored in a dictionary data-storage circuit.

FIG. 13 is a schematic diagram of an overview of the dictionary data that is stored in the dictionary data-storage circuit. As shown in FIG. 13, the dictionary data is stored by establishing a correspondence between the RGB data, which are indicated by nine digit numbers such as 010030045, 100150200, 105030060, 101020050, 025060050, . . . , 100200230, and the index values such as 0, 1, 2, 3, 4, . . . , n.

Figure 14:
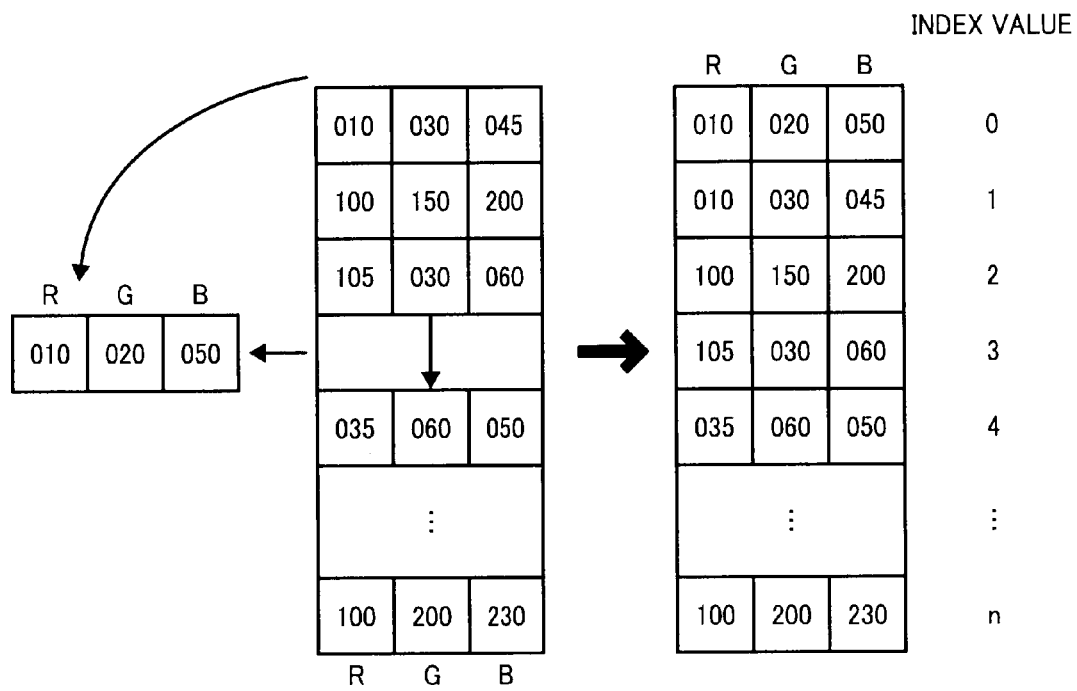
FIG. 14 is a schematic diagram for explaining an index updating process of the dictionary data using an MTF method that is based on the dictionary data.

The color data-encoding processing unit 118 shown in FIG. 5 uses a move to front (MTF) method while referring to the dictionary data and encodes the RGB data of each run to the index values. To be specific, first the color data-encoding processing unit 118 determines whether the RGB data of the target run is stored in the dictionary data. In the example shown in FIG. 13, a nine digit RGB data 010020050 of the target run is stored in the dictionary data by establishing a correspondence with the index value 3. Thus, the color data-encoding processing unit 118 encodes the RGB data of the target run to the index value 3. Next, as shown in FIG. 14, the color data-encoding processing unit 118 sets to the topmost value of 0, the index value of the RGB data, in the dictionary data, that is the same as the RGB data of the target run. Simultaneously, the color data-encoding processing unit 118 shifts to one space below, the respective index values of the RGB data (010030045, 100150200, and 105030060 in the example shown in FIG. 14) that correspond to the index values in higher positions than the index value 3.

Figure 15:
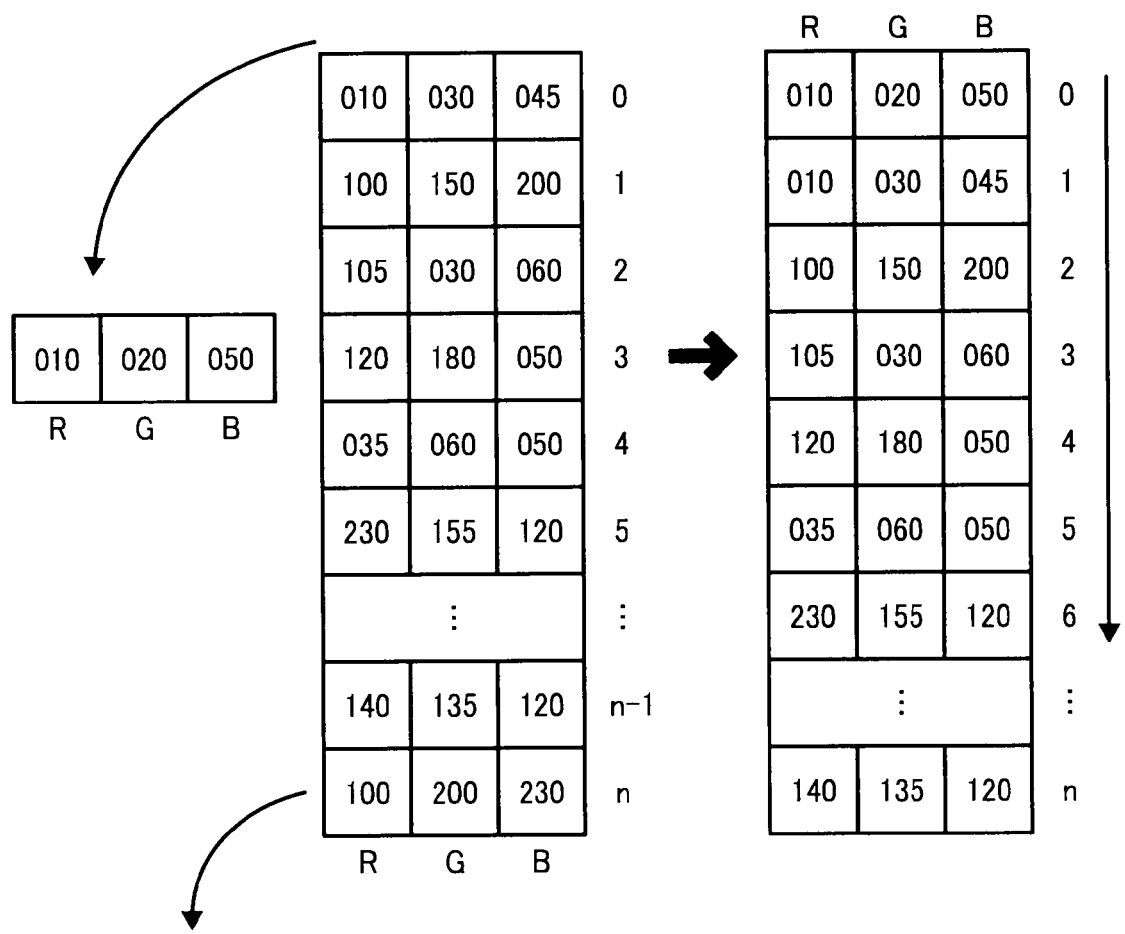
FIG. 15 is a schematic diagram for explaining a data adding process and the index updating process of the dictionary data using the MTF method based on the dictionary data.

If the RGB data of the target run is not stored in the dictionary data, the color data-encoding processing unit 118 outputs the RGB data to the next process without encoding the RGB data to the index value. Further, as shown in FIG. 15, the color data-encoding processing unit 118 deletes from the dictionary data, the RGB data 100200230 that corresponds to the index value n that is the bottommost index value in the dictionary data. Next, after shifting the respective index values of the remaining RGB data to one place below, the color data-encoding processing unit 118 establishes a correspondence between the RGB data 100200230, which is determined as not stored in the dictionary data, with the topmost index value 0, and writes the RGB data to the dictionary data.

The structure mentioned earlier enables to reliably store the dictionary data in the limited memory capacity of the dictionary data-storage circuit. Further, a first in first out (FIFO) method can also be used instead of the MTF method.

Figure 16:
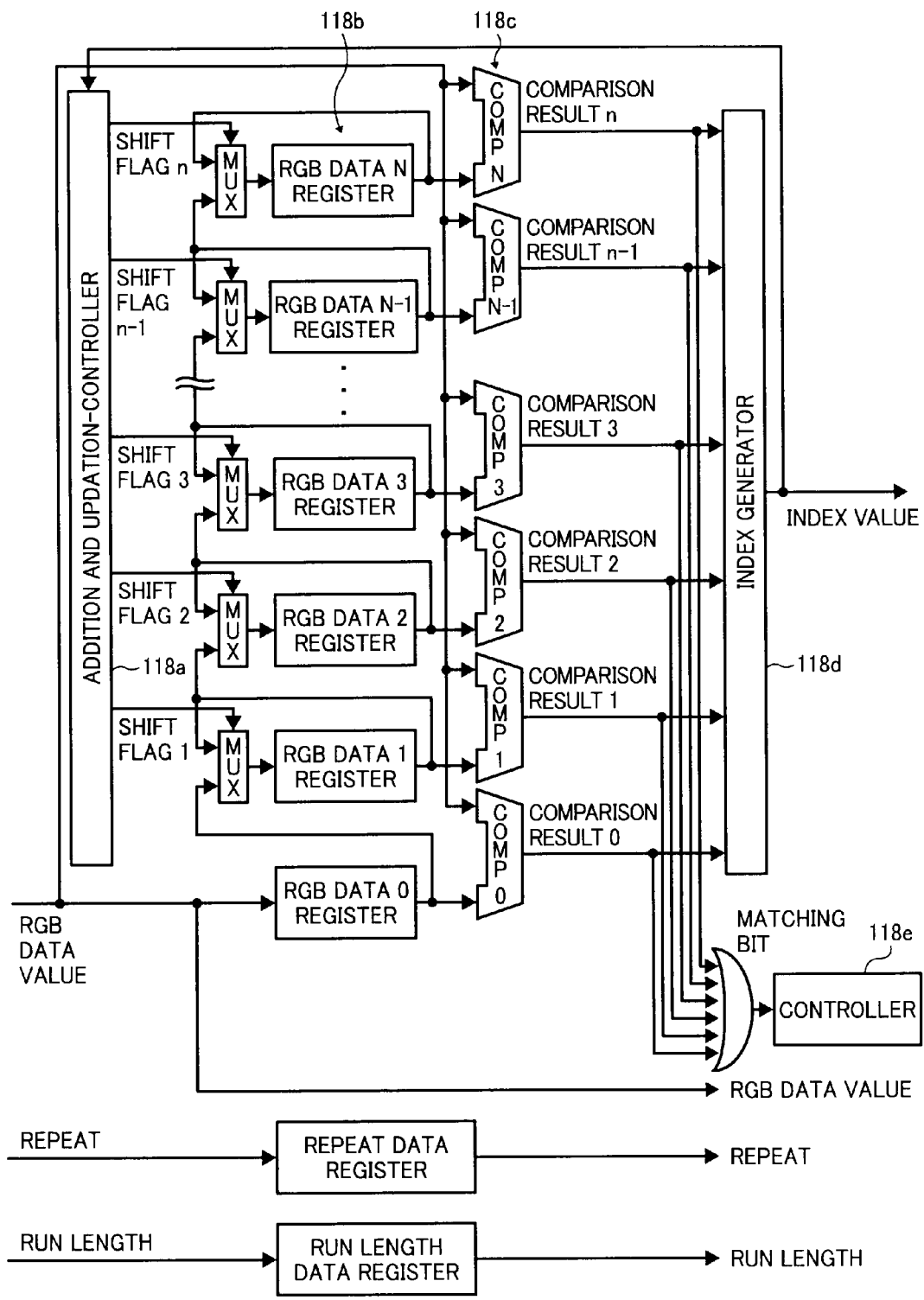
FIG. 16 is a block diagram of an example of a circuit structure of a dictionary control unit in a color data-encoding processing unit shown in FIG. 5.

FIG. 16 is a block diagram of an example of a circuit structure of a dictionary control unit in the color data-encoding processing unit 118. As shown in FIG. 16, the dictionary control unit includes an addition and update control unit 118a, a register 118b, a comparing circuit cluster 118c, an index generating unit 118d, and a control unit 118e. The register 118b includes a plurality of RGB data registers for storing therein the RGB data, a repeat data register for storing therein the repeat data, and a run length data-register for storing therein the run length data. The comparing circuit cluster 118c includes a plurality of comparing circuits.

The dictionary data includes N+1 number of the RGB data from RGB data 0 to RGB data N. The RGB data 0, which is the first RGB data, is stored in an RGB data 0 register. The RGB data 1, which is the second RGB data, is stored in an RGB data 1 register. Similarly, the RGB data N, which is the (N+1)th RGB data, is stored in an RGB data N register. Thus, the RGB data registers include N+1 number of RGB data registers and each RGB data register stores therein the RGB data that differs from the RGB data in the other RGB data registers.

The comparing circuit cluster 118c includes N+1 number of comparing circuits (COMP 0 to COMP N). The comparing circuit COMP 0 compares the RGB data that is stored in the RGB data 0 register with the RGB data of the target pixel and outputs data that indicates whether the RGB data are matching. The comparing circuit COMP 1 compares the RGB data that is stored in the RGB data 1 register with the RGB data of the target pixel and outputs data that indicates whether the RGB data are matching. The comparing circuit COMP N compares the RGB data that is stored in the RGB data N register with the RGB data of the target pixel and outputs data that indicates whether the RGB data are matching.

Figure 17:
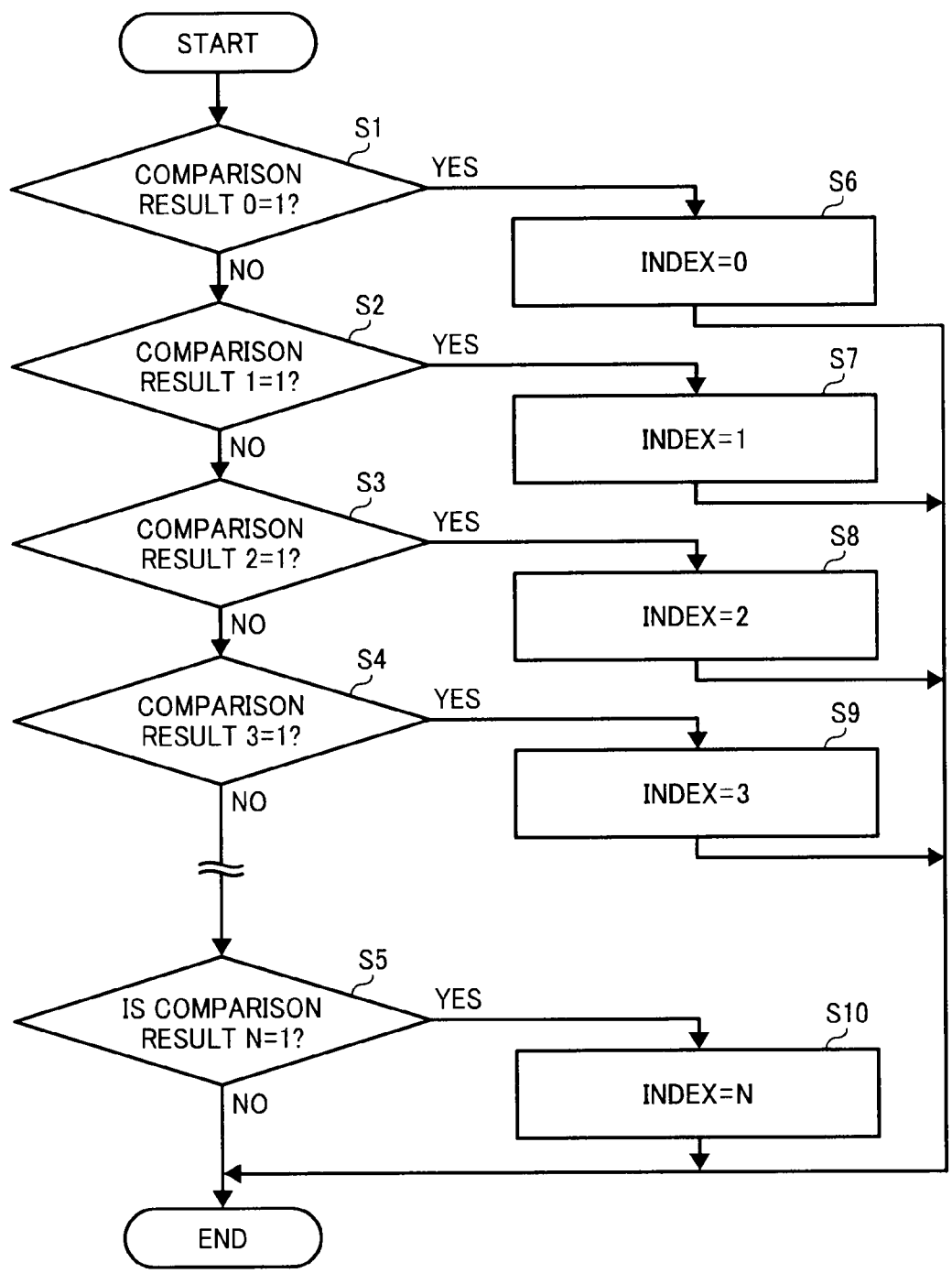
FIG. 17 is a flowchart of an index generating process.

The RGB data of the target pixel in the RGB band data is input into each comparing circuit (COMP 0 to COMP N) in the comparing circuit cluster 118c. Simultaneously, the RGB data in the RGB data 0 register, the RGB data 1 register, the RGB data N register are input into the comparing circuit COMP 0, the comparing circuit COMP 1, the comparing circuit COMP N respectively. The comparing circuits COMP 0 to COMP N determine whether the RGB data of the respective target pixels are matching with the respective RGB data from the RGB data 0 register to the RGB data N register. The RGB data 0 register, the RGB data 1 register, the RGB data N register correspond respectively to an index 0, an index 1, an index N that are the respective index values of the dictionary data. As indicated by the flowchart shown in FIG. 17, if the RGB data are matching based on a determination result, the index generating unit 118d outputs as the index value, a number of the comparing circuit COMP corresponding to the respective determination result. For example, if the RGB data are matching in an output from the comparing circuit COMP 3, the index generating unit 118d outputs "3" as the index value.

Figure 18:
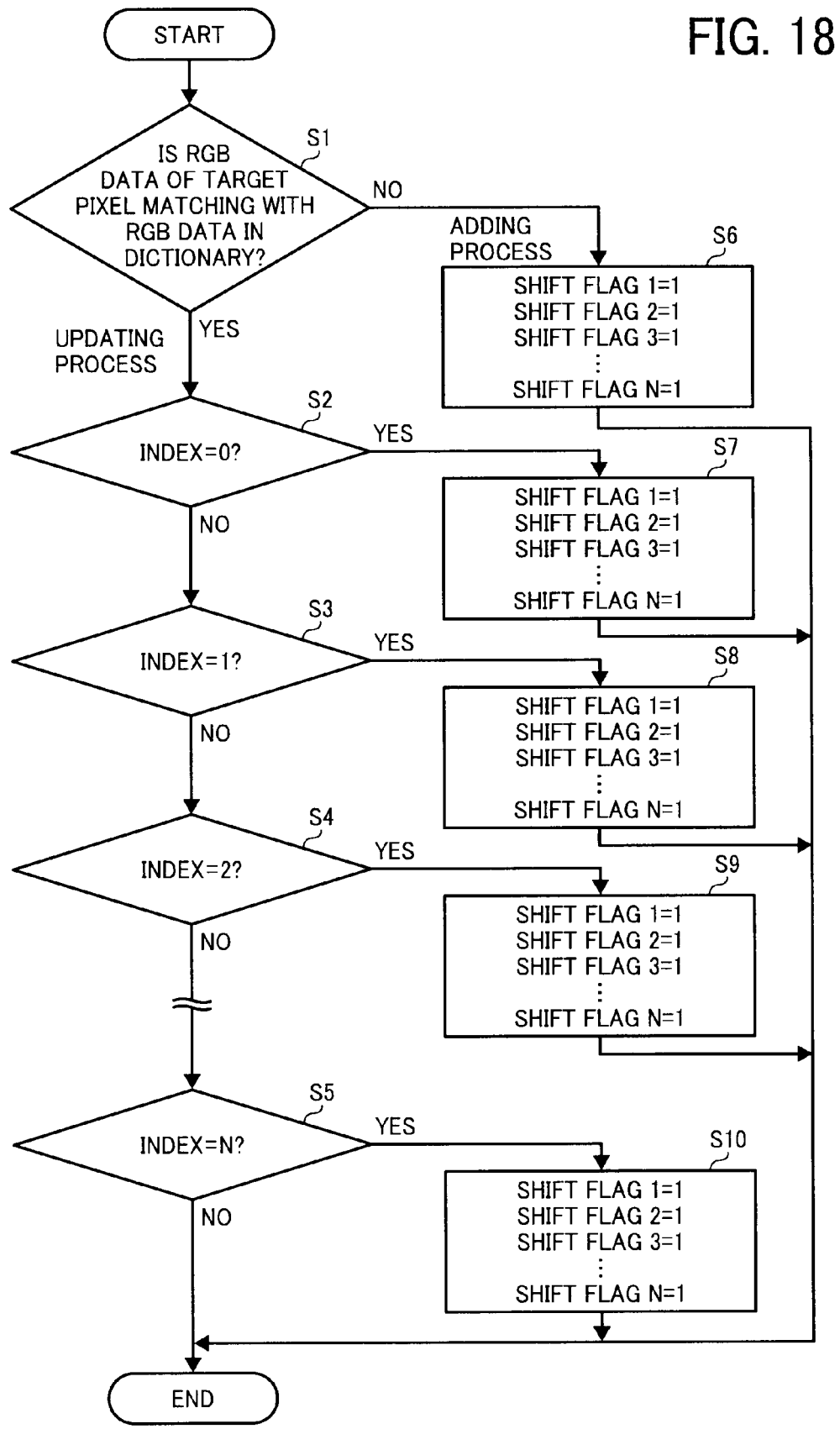
FIG. 18 is a flowchart of a dictionary updating process.

The index value is output to the code format generating unit 119 and the addition and update control unit 118a. As indicated by the flowchart shown in FIG. 18, based on the received index value, the addition and update control unit 118a outputs shift flag data to a multiplexer (MUX) that is separately arranged in the respective RGB data register. To be specific, if the index value, which is received from the index generating unit 118d, is a value corresponding to any one of the RGB data registers, the addition and update control unit 118a outputs the shift flag data to the multiplexer corresponding to the respective RGB data register and to the multiplexers corresponding to the RGB data registers that are at a higher position (except the RGB data 0 register) than the RGB data register corresponding to the index value. If the index value is not transmitted from the index generating unit 118d, in other words, if the RGB data of the target pixel is not matching with any of the RGB data in the dictionary, the addition and update control unit 118a outputs the respective shift flag data to all the multiplexers.

The multiplexer in the RGB register, which receives the shift flag data from the addition and update control unit 118a, rewrites as the RGB data inside the RGB data register corresponding to the multiplexer itself, the RGB data that is stored in the RGB data register that is positioned one space higher than the RGB data register corresponding to the multiplexer. Further, the RGB data in the RGB data 0 register is rewritten by the RGB data of the target pixel regardless of whether the RGB data is matching with the RGB data of the target pixel. Thus, updation of the dictionary data is carried out using the MTF method.

Figure 19:
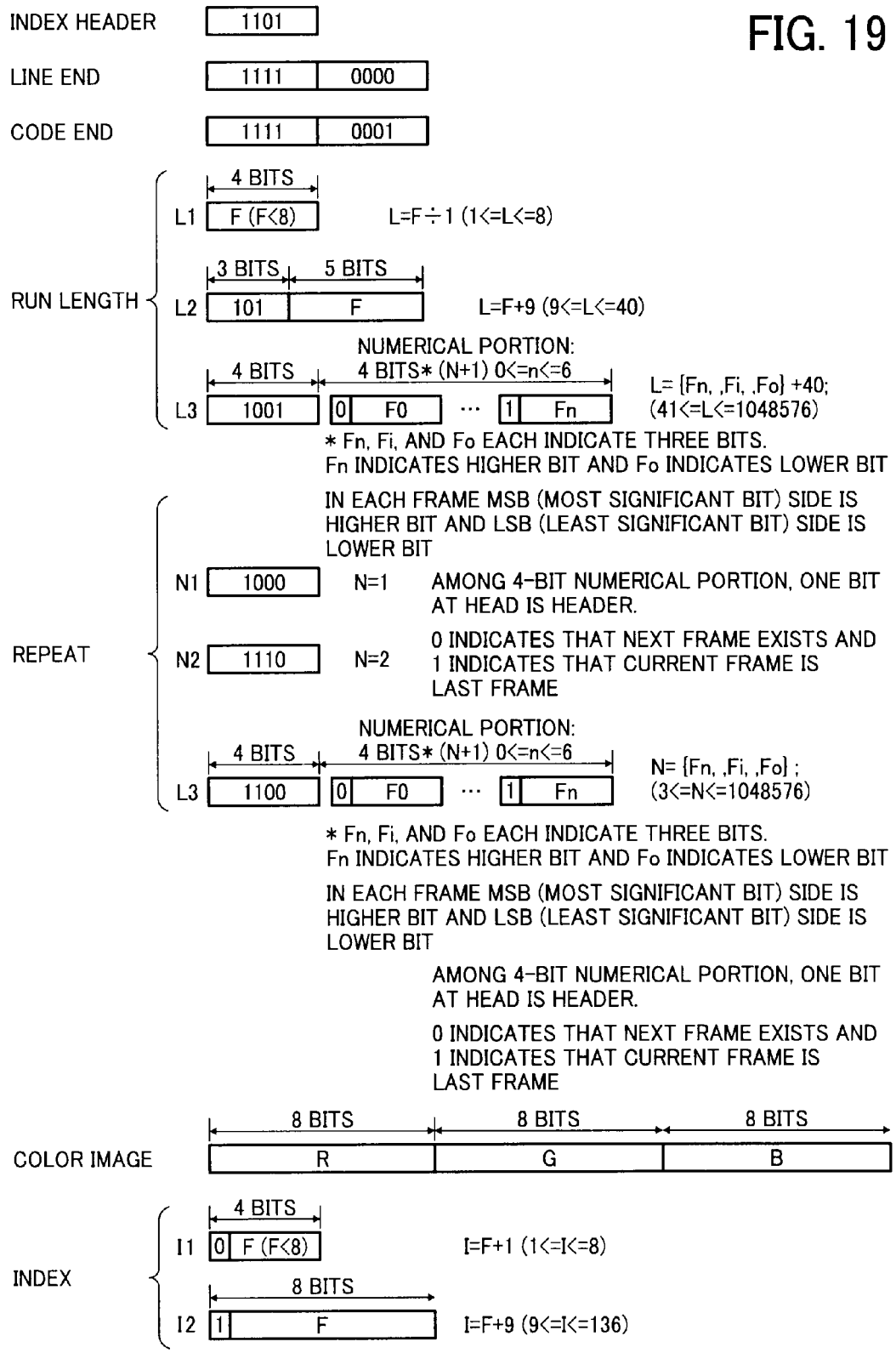
FIG. 19 is a schematic diagram of a code format that is generated by a code format generating unit of the encoding device.
Figure 20A:
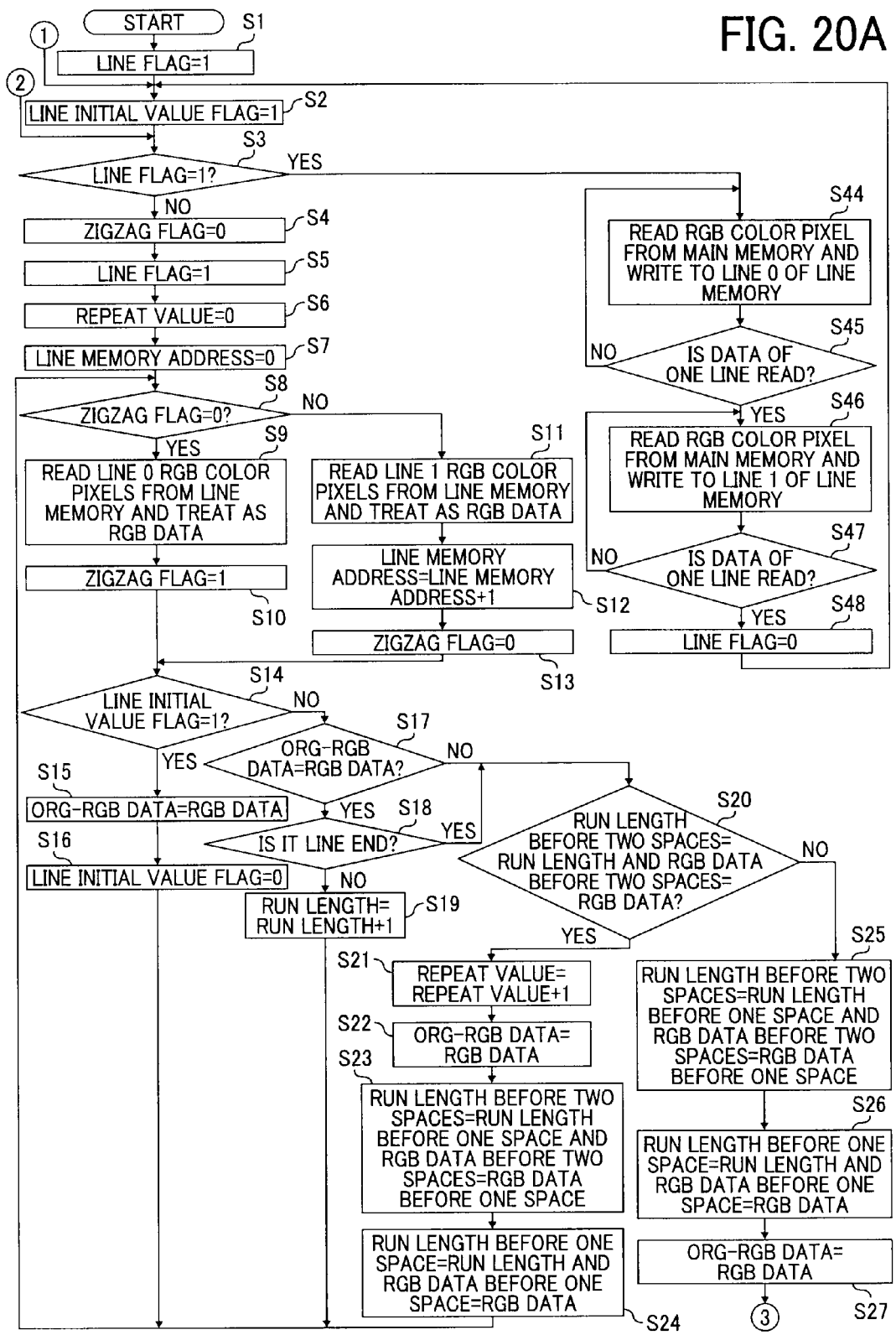
FIGS. 20A and 20B are flowcharts of the entire data process that are executed by the encoding device.
Figure 20B:
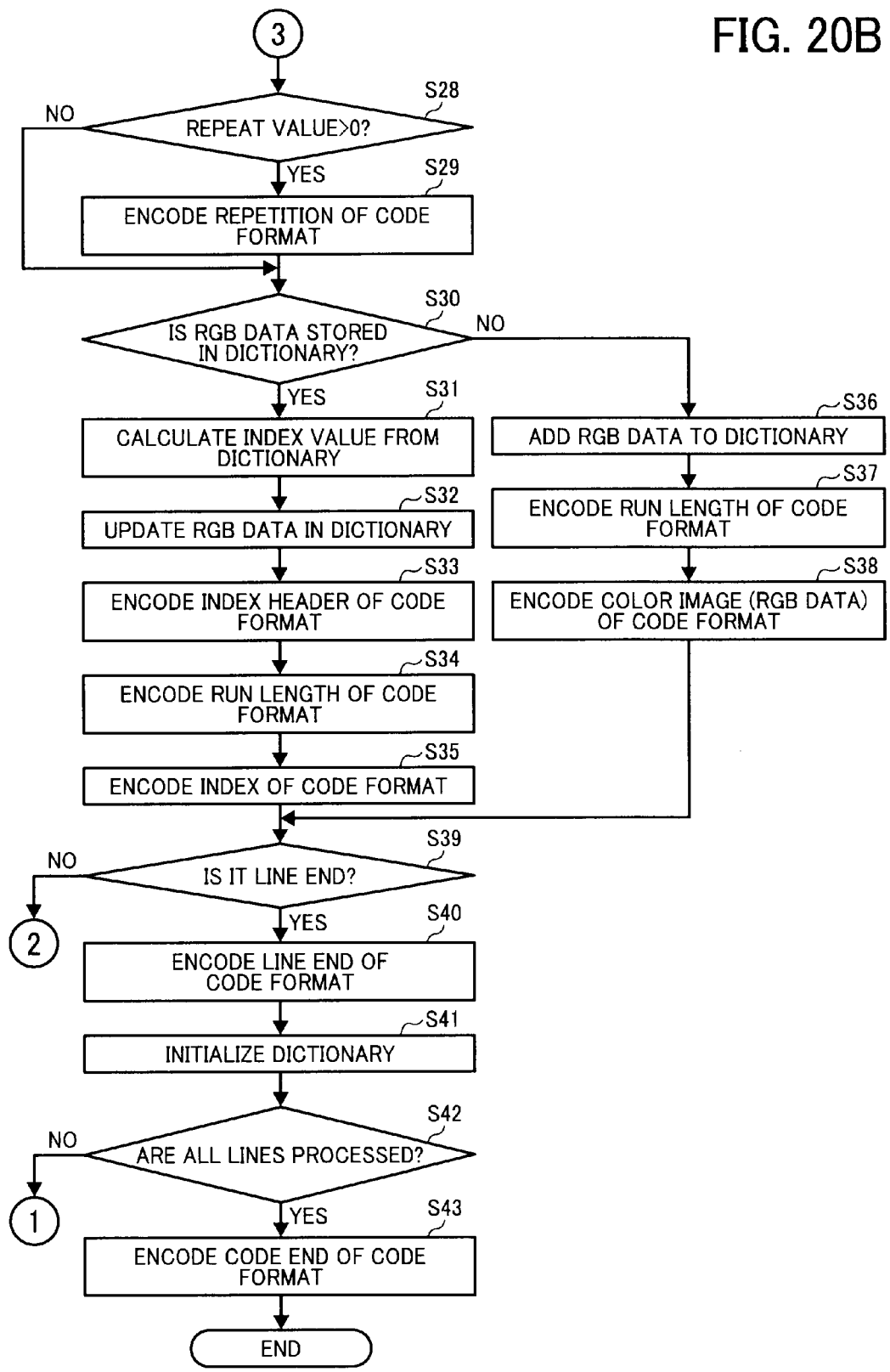

The multivalue run length data, which is output from the color data-encoding processing unit 118 shown in FIG. 5, is encoded by the code format generating unit 119 to the bit format shown in FIG. 19 and is output to the memory arbiter interface 111. A flow of the entire data process, which is carried out by the encoding device 110, is shown in FIGS. 20A and 20B.

Figure 21:
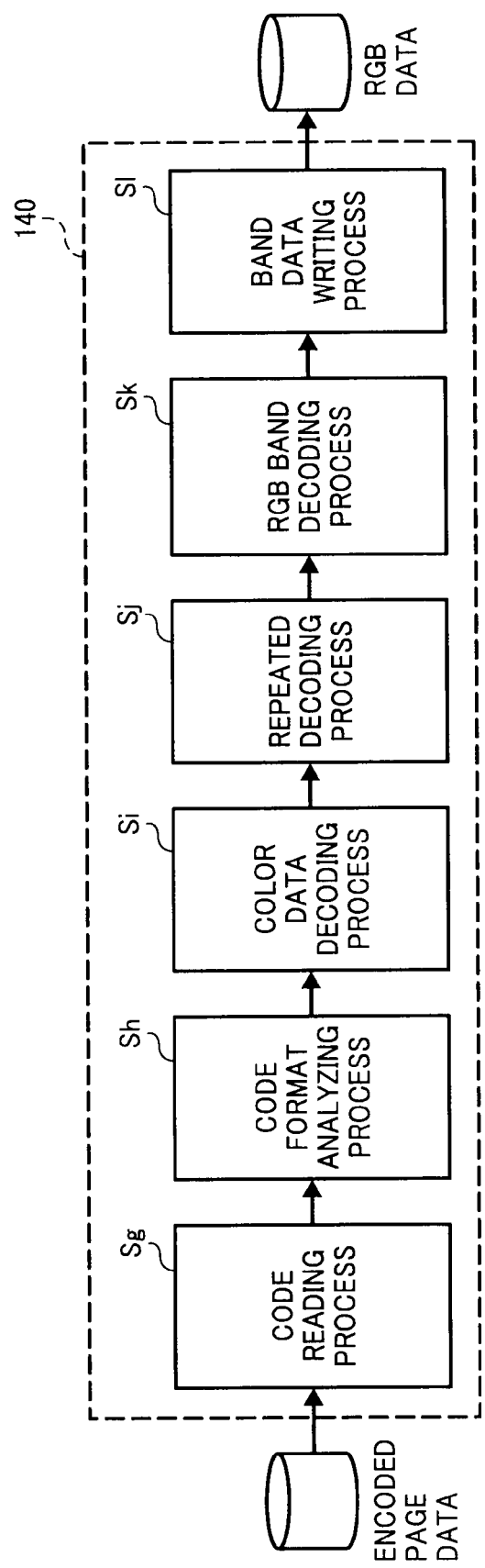
FIG. 21 is a flowchart of a data process that is executed by a decoding unit of the printer according to the embodiment.

FIG. 21 is a flowchart of a data process that is executed by the decoding device 140 that is shown in FIG. 2. The decoding device 140 uses a flow that is reverse of the flow of the data process executed by the encoding device 110 to decode the encoded page data to the RGB data. To be specific, first the decoding device 140 executes a code reading process (Sg) for reading the encoded page data that is stored in the encoded page-memory area 102d of the main memory 102. After executing a code format analyzing process (Sh) for analyzing a code format of the read encoded page data, the decoding device 140 executes a color data decoding process (Si) for decoding the index values in the multivalue run length data to the RGB data. Next, after executing a repeated decoding process (Sj) for decoding the repeat data in the multivalue run length data to the run lengths and the RGB data, the decoding device 140 executes an RGB band decoding process (Sk) for decoding the run length data and the RGB data in each run of the multivalue run length data to the RGB band data. Next, after using a band data writing process (Sl) to output the RGB band data to a memory arbiter interface 149 of the decoding device 140 itself, the decoding device 140 collects the RGB band data for each page and writes the pagewise RGB band data to the main memory 102 as the RGB data.

Figure 22:
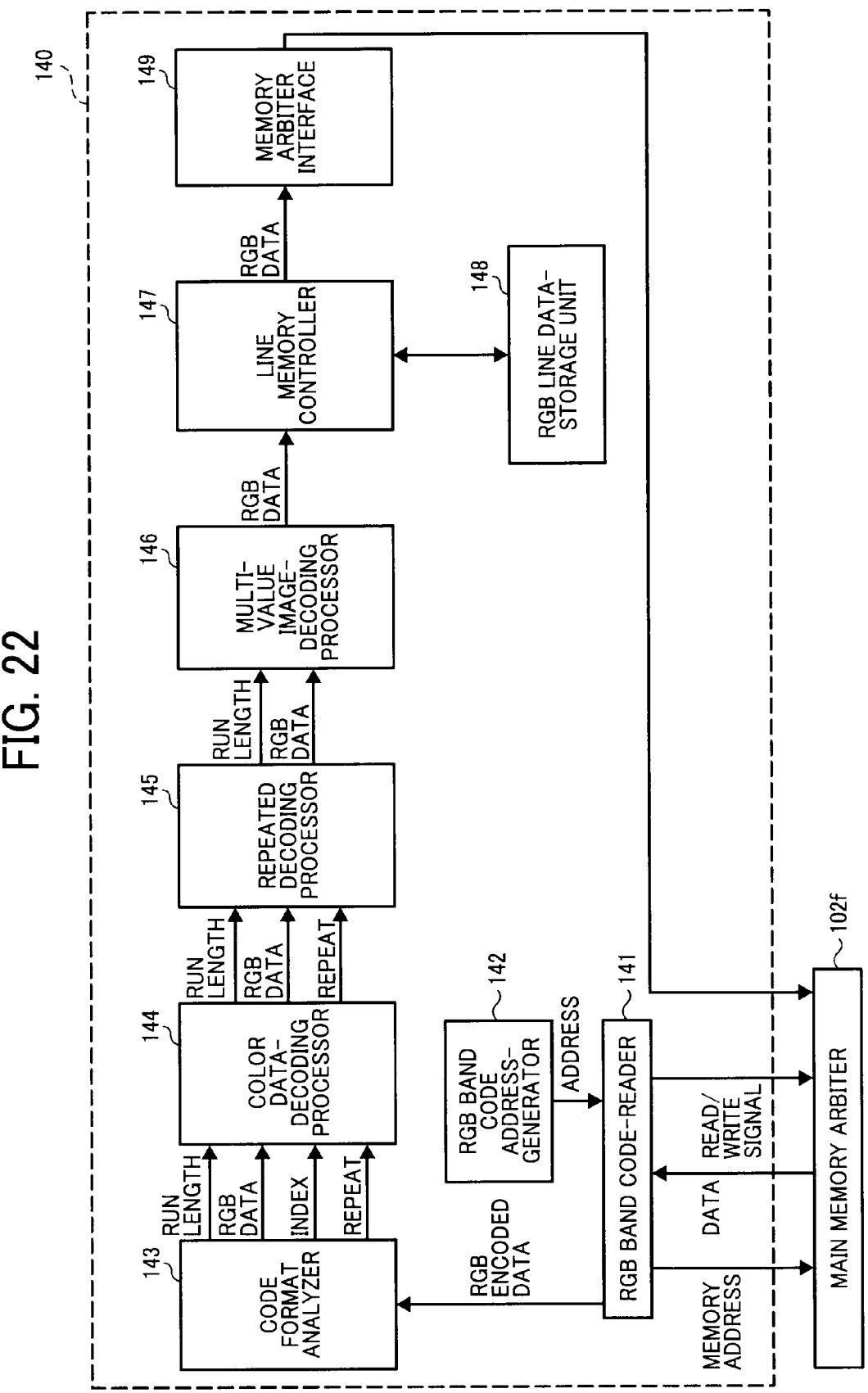
FIG. 22 is an internal block diagram of the decoding unit shown in FIG. 2.

FIG. 22 is an internal block diagram of the decoding device 140. As shown in FIG. 22, the decoding device 140 includes an RGB band code-reading unit 141, an RGB band code address-generating unit 142, a code format analyzing unit 143, a color data-decoding processing unit 144, a repeated decoding processing unit 145, a multivalue image-decoding processing unit 146, and the memory arbiter interface 149.

The RGB band code-reading unit 141 sequentially reads the encoded page data from the head and distributes the read encoded page data to the code format analyzing unit 143. After the code format analyzing unit 143 has analyzed the code format of the multivalue run length data, the color data-decoding processing unit 144, which is a color data decoding unit, decodes the respective index values of the multivalue run length data to the respective RGB data. Next, the repeated decoding processing unit 145, which is a repeated decoding unit, decodes the respective repeat data to the run lengths and the RGB data of the multiple runs, and distributes the multivalue run length data to the multivalue image-decoding processing unit 146. The multivalue image-decoding processing unit 146, which is a multivalue image decoding unit, decodes to the RGB band data, the multivalue run length data that is transmitted from the repeated decoding processing unit 145. In the RGB band data, the individual pixels are aligned in the zigzag direction due to scanning by the line memory control unit 114 of the encoding device 110. Because a process by the printer engine 190 cannot be carried out in such an alignment, the alignment in the zigzag direction needs to be converted into an alignment in a horizontal line direction.

Figure 23:
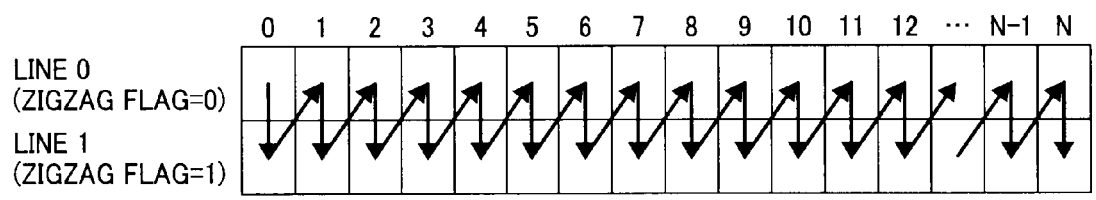
FIG. 23 is a schematic diagram for explaining an expanding process of the RGB band data to a two-line virtual matrix area that is executed by a line memory control unit of the decoding unit.
Figure 24:
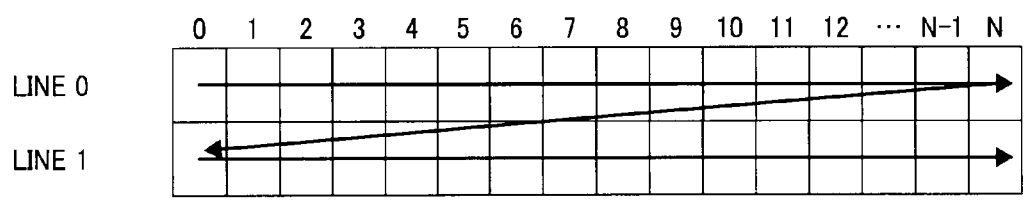
FIG. 24 is a schematic diagram for explaining a re-reading direction of the band data after the expanding process.

As shown in FIG. 23, a line memory control unit 147 of the decoding device 140 writes in the zigzag direction, the data of each pixel of the RGB band data to a two-line virtual matrix area of an RGB line data-storing unit 148. Next, as shown in FIG. 24, after writing of two-lines is completed, the line memory control unit 147 reads in the horizontal line direction, each pixel data of the two-line virtual matrix area and sequentially outputs the pixel data to the memory arbiter interface 149.

Figure 25:
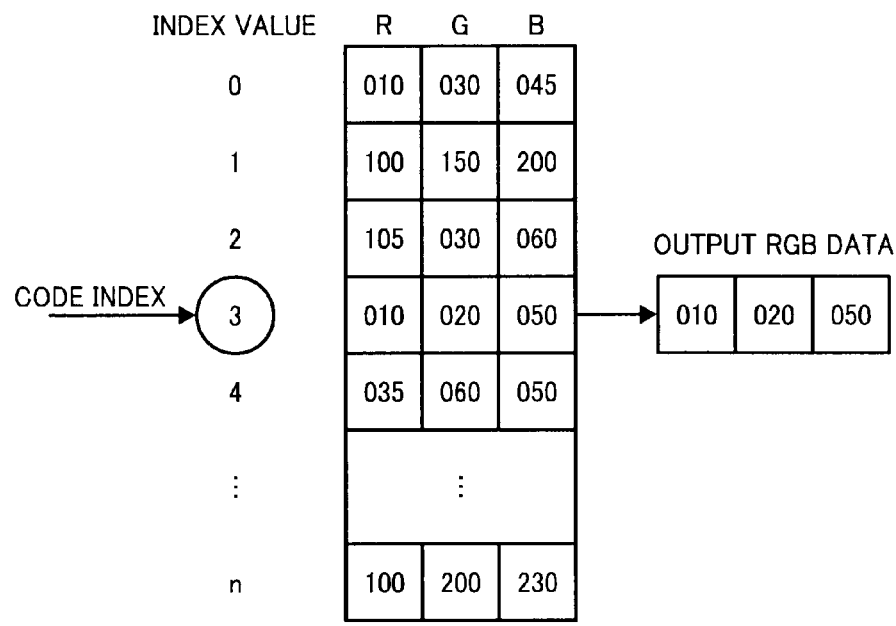
FIG. 25 is a schematic diagram for explaining a decoding process from index values to RGB data that is executed by a color data-decoding processing unit of the decoding unit.
Figure 26:
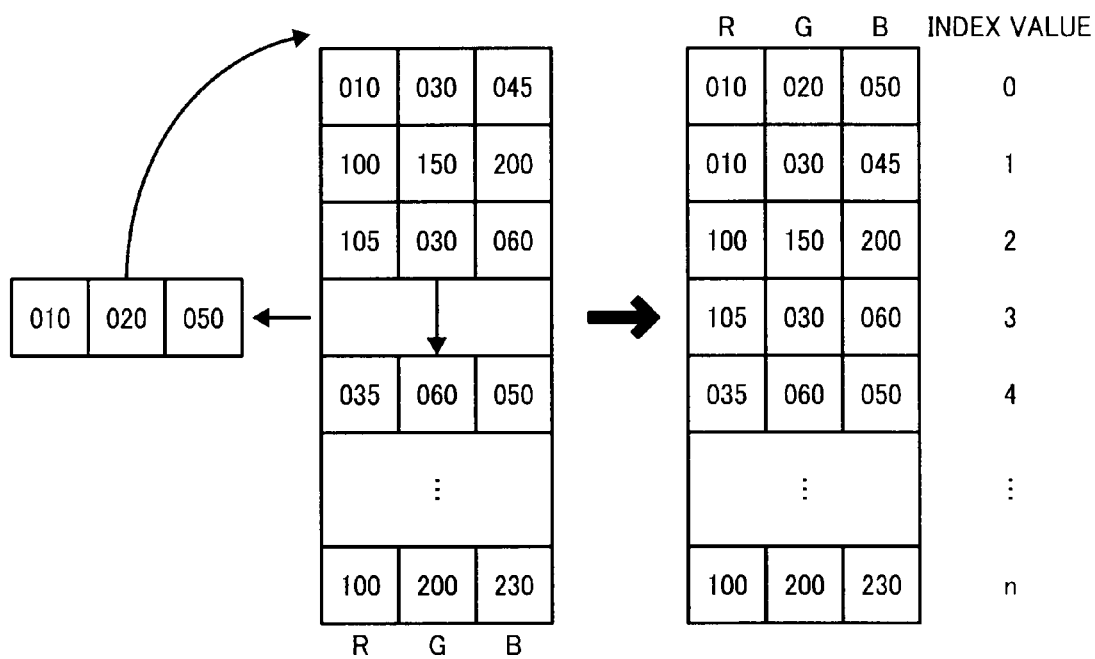
FIG. 26 is a schematic diagram for explaining the index updating process of the dictionary data that is executed by the color data-decoding processing unit.

The color data-decoding processing unit 144 shown in FIG. 22 shares the dictionary data with the color data-encoding processing unit 118 that is shown in FIG. 5. To be specific, the multiple dictionary data, which individually correspond to the respective multiple RGB band data, are stored in the dictionary data-storage circuit. The address data of the RGB band data, which has contributed to encoding, corresponds to the respective dictionary data. The color data-decoding processing unit 144 detects the address data of the multivalue run length data that is transmitted from the line memory control unit 114, uses the dictionary data corresponding to the address data, and decodes the index values in the multivalue run length data to the RGB data. As shown in FIG. 25, the color data-decoding processing unit 144 decodes the index values in the multivalue run length data to the RGB data of the same index values in the dictionary data. Next, as shown in FIG. 26, the color data-decoding processing unit 144 sets the index values of the RGB data in the dictionary data to 0 that is the topmost value and shifts to one space below, the respective index values of the RGB data that correspond to the index values in higher positions than the index value of the same RGB data. Due to the process mentioned earlier, the multiple index values, which are encoded by the color data-encoding processing unit 118 of the encoding device 110 shown in FIG. 5, can be decoded to the respective RGB data.

Figure 27:
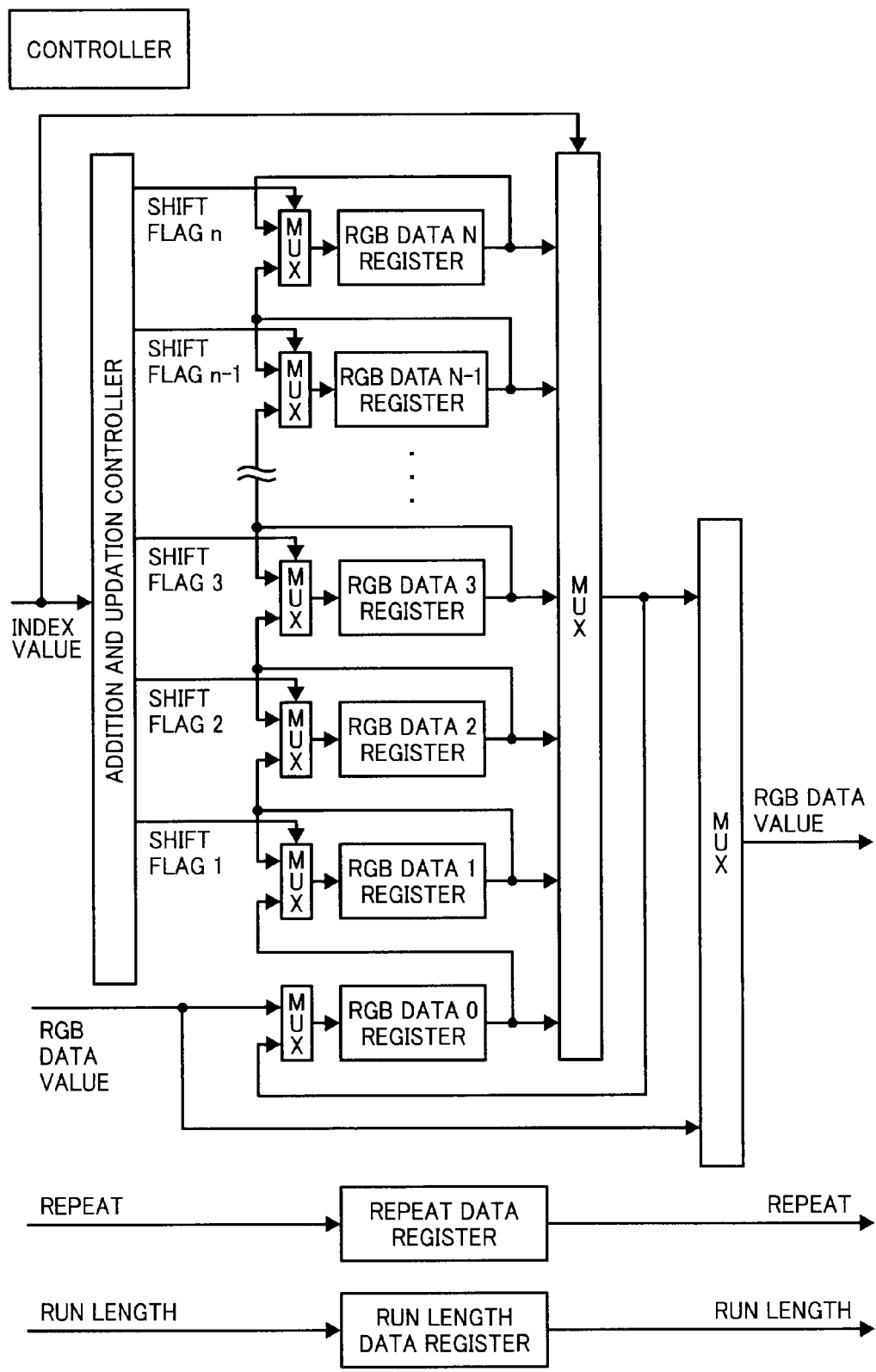
FIG. 27 is a block diagram of an example of a circuit structure of a dictionary control unit in the color data-decoding processing unit.
Figure 28:
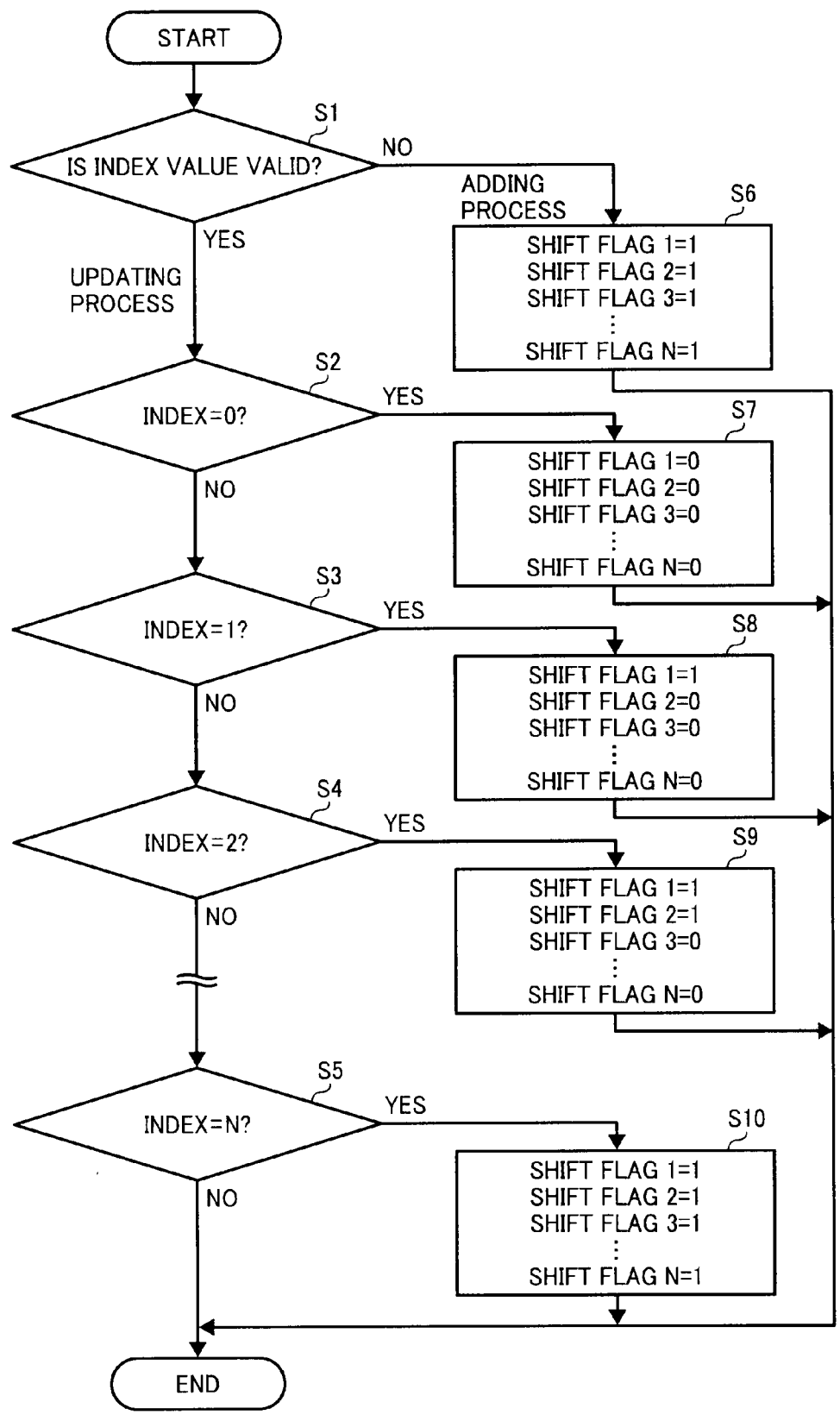
FIG. 28 is a flowchart of the dictionary updating process that is executed by the dictionary control unit.

FIG. 27 is a block diagram of an example of a circuit structure of a dictionary control unit in the color data-decoding processing unit 144. The dictionary control unit, which includes a structure that is nearly similar to the structure, shown in FIG. 16, of the dictionary control unit of the color data-encoding processing unit 118, executes a dictionary updating process that is shown in FIG. 28 and updates the dictionary data using the MTF method.

Figure 29:
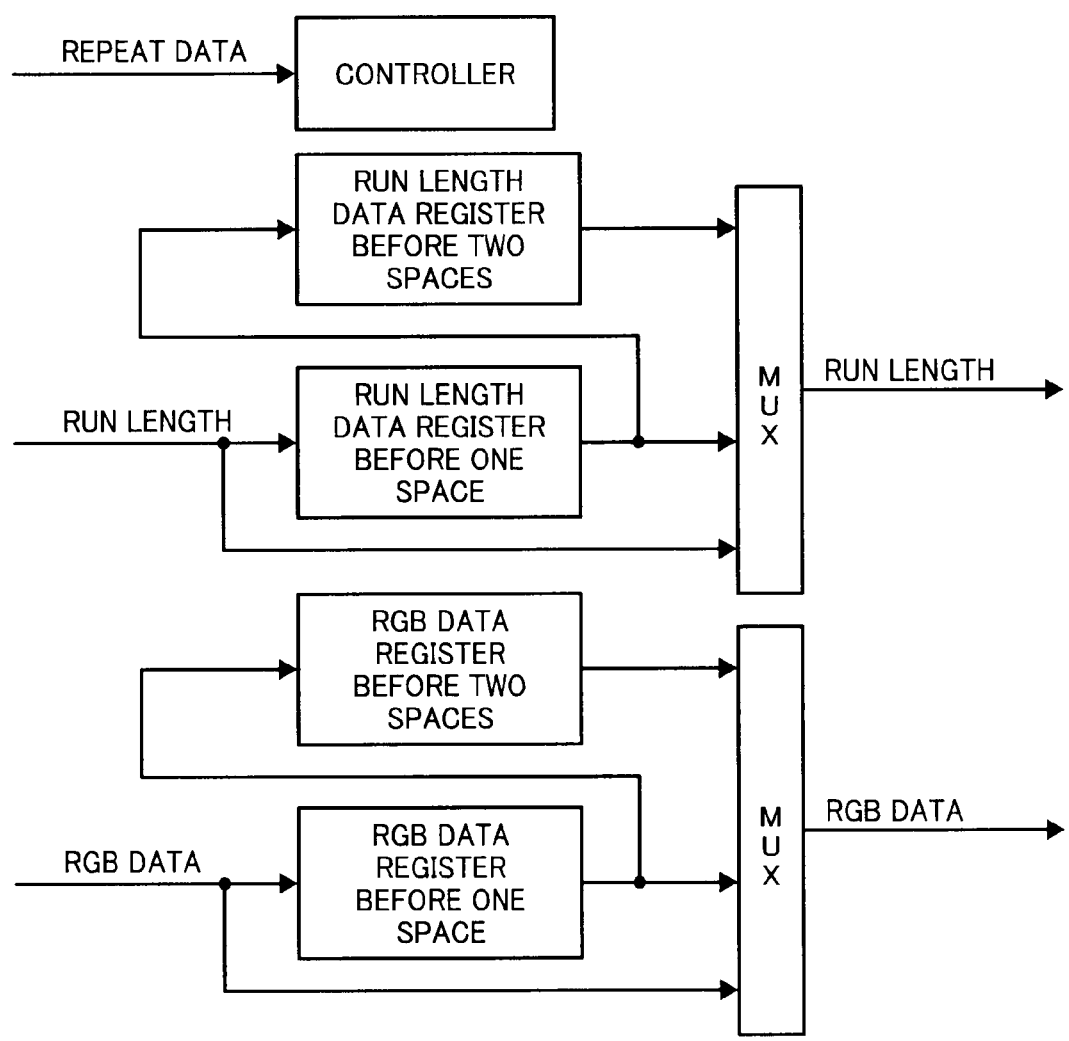
FIG. 29 is a block diagram of an example of a circuit structure in a repeated decoding processing unit.

FIG. 29 is a block diagram of an example of a circuit structure in the repeated decoding processing unit 145. As shown in FIG. 29, the repeated decoding processing unit 145 decodes the repeat data, the run length data, and the RGB data that are output from the not shown color data-decoding processing unit 144 to the run length data and the RGB data that do not include repeat codes.

Figure 30:
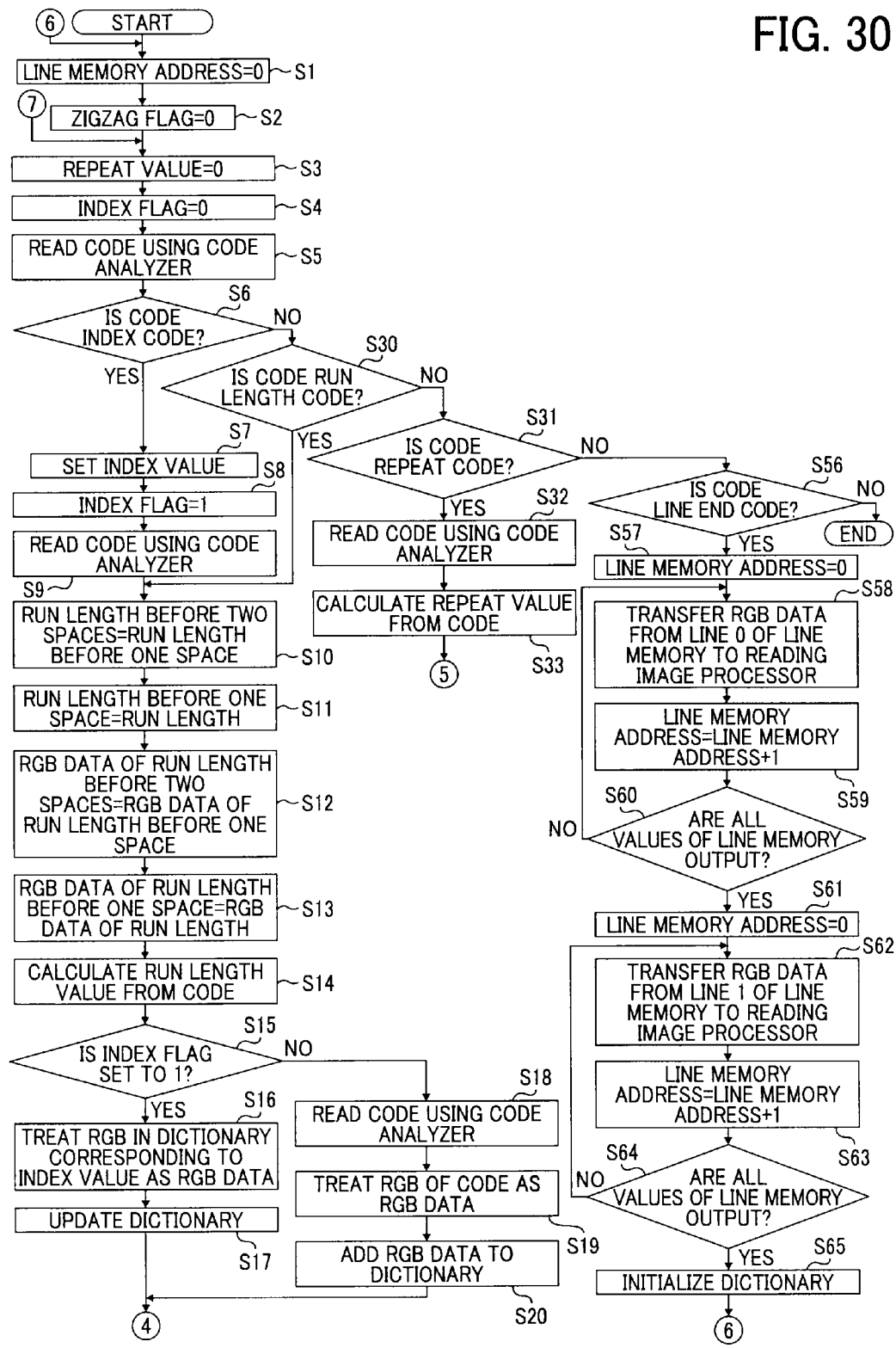
FIG. 30 is a flowchart of the entire data process that is executed by the decoding unit.
Figure 31A:
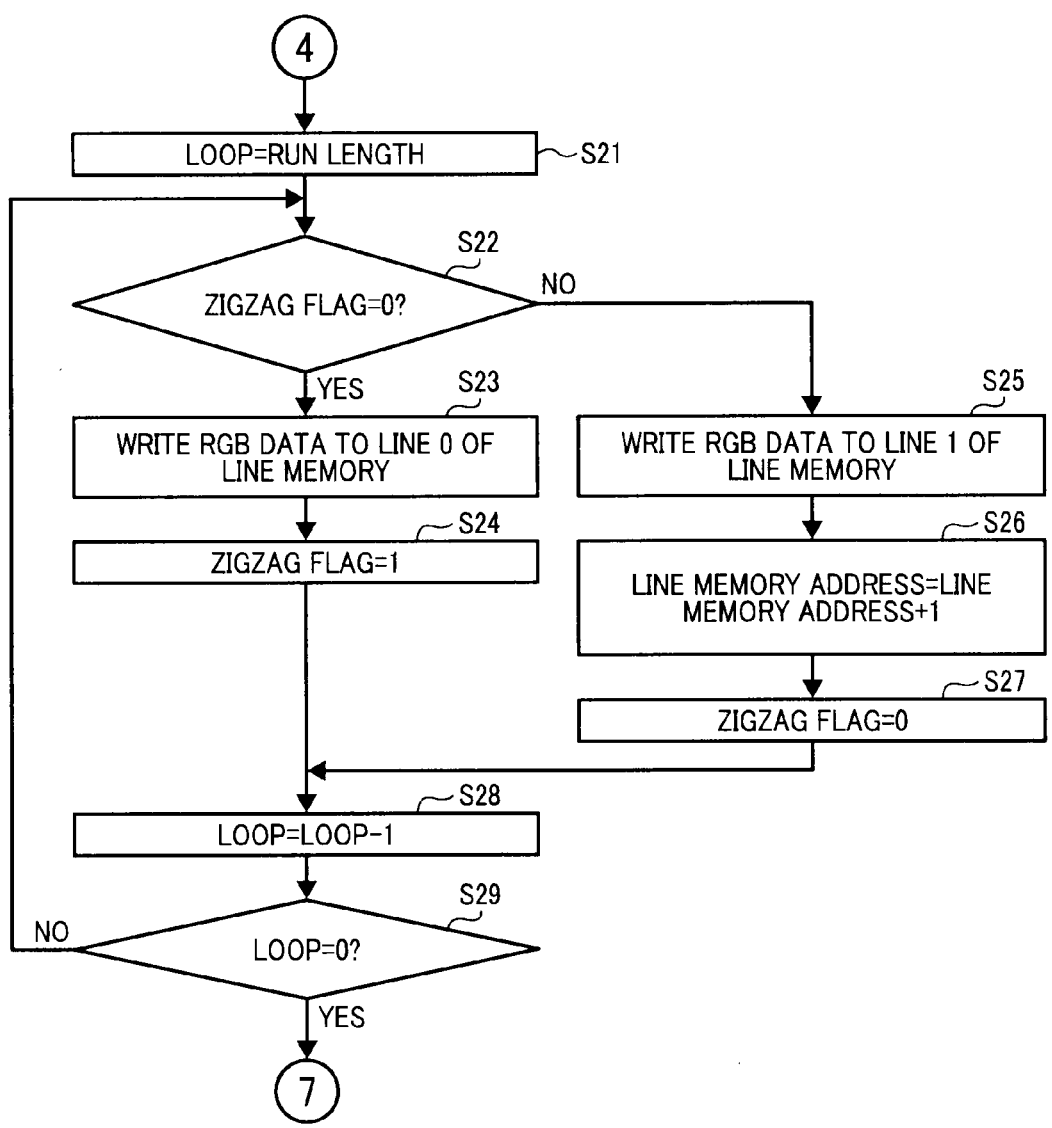

A flow of the entire data process, which is executed by the decoding device 140, is shown in FIGS. 30, 31A and 31B.

In the printer that is explained in the embodiment, the toner images of different colors that are sequentially formed on the photosensitive element 1 are overlapped and transferred onto the intermediate transfer belt 10 to get a multicolor image. However, the present invention can also be applied to an image forming apparatus that forms a multicolor image using a tandem method that is explained next. In the tandem method, the toner images of different colors, which are developed on surfaces of a plurality of latent image carrying members, are overlapped and transferred into a transfer medium such as a recording sheet. Further, in the example explained in the embodiment, the present invention is applied to the electronographic printer. However, the present invention can also be applied to an image forming apparatus that forms a color image using a direct recording method. In the direct recording method, a toner cluster, which is caused to fly in a dot shape from a toner flying device, is directly caused to adhere to a recording medium or an intermediate recording medium to form a pixel image, thus directly forming the toner image on the recording medium or the intermediate recording medium without using the latent image carrying members. The direct recording method is used in the image forming apparatus that is disclosed in Japanese Patent Application Laid-open No. 2002-307737. Further, the present invention can also be applied to an image forming apparatus that forms a color image using an inkjet method.

The encoding device 110 of the printer according to the embodiment includes the repeated encoding device in the form of the repeated encoding processing unit 117 that detects, in the multivalue run length data, the regular repetition of a run that is isochromatic and of the same length, and encodes the repeatedly appearing run to the repeated data. Thus, encoding, to the repeated data, the run length data and the RGB data of the repeatedly appearing run that is isochromatic and of the same length, enables to compress the multivalue image data at a higher compression rate and to further reduce the memory capacity.

Further, the encoding device 110 of the printer according to the embodiment uses as the dictionary data, data that stores therein only a predetermined number of the RGB data (color data). The encoding device 110 includes the color-data encoding unit in the form of the color data-encoding processing unit 118 that determines whether the RGB data of the respective run in the multivalue run length data is stored in the dictionary data. If the RGB data is stored in the dictionary data, the color data-encoding processing unit 118 encodes the RGB data to the index value. If the RGB data is not stored in the dictionary data, the color data-encoding processing unit outputs the RGB data without encoding, deletes one other RGB data in the dictionary data, and executes a process to write in the dictionary data, the RGB data that cannot be encoded. Due to this, the dictionary data can be reliably stored in the limited memory capacity of the dictionary data-storage circuit.

Further, upon determining, for the RGB data of each individual run in the multivalue run length data, that the RGB data is stored in the dictionary data, the color data-encoding processing unit 118 in the encoding device 110 of the printer according to the embodiment executes, while setting the index value of the RGB data to 0 that is the topmost value, a process to shift to one space below, the index values of the RGB data that correspond to the index values that are higher than the index value of the RGB data in the dictionary data. Upon determining that the RGB data is not stored in the dictionary data, the color data-encoding processing unit 118 deletes from the dictionary data, the RGB data corresponding to the bottommost index value in the dictionary data, shifts to one space below, the index values of the remaining RGB data, and writes in the dictionary data, the RGB data that is determined as not stored in the dictionary data by establishing a correspondence between the RGB data and the topmost index value. Thus, the post encoding index value of the RGB data of relatively high appearance frequency is changed to a value that is smaller than the post encoding index value of the RGB data of relatively low appearance frequency, thereby enabling to further reduce the memory capacity.

Further, the color data-encoding processing unit 118 in the encoding device 110 of the printer according to the embodiment includes a plurality of comparing units for individually comparing the RGB data of the runs in the multivalue run length data to the mutually differing RGB data that are stored in the dictionary data. Due to this, compared to when only one comparing circuit is included, an encoding process speed from the RGB data to the index values can be enhanced.

The encoding device 110 of the printer according to the embodiment includes a reading unit in the form of the band data reading unit 112 that reads, only in a predetermined number of the horizontal lines, data of the pixels in the multivalue image data in the form of the RGB band data. The encoding device 110 also includes re-reading units (the line memory control unit 114 and the band data-temporary storing unit 115) that re-read the data of the pixels to sequentially scan the matrix partition area where the multiple pixels are aligned in the vertical direction and in the horizontal direction in the pixel cluster that is read by the band data reading unit 112. Further, the encoding device 110 also includes a multivalue run length-encoding device in the form of the multivalue run length-encoding processing unit 116 that encodes to the multivalue run length data, the data that is re-read by the re-reading units. Due to this, the alignment of the pixels in the vertical direction and in the horizontal direction is reflected in the run lengths. Thus, compared to the existing encoding device in which only the alignment in the horizontal direction is reflected in the run lengths, the compression rate of the image data can be enhanced and the memory capacity can be further reduced.

The decoding device 140 of the printer according to the embodiment includes a color data decoding unit in the form of the color data-decoding processing unit 144 that decodes to the RGB data, based on the dictionary data, the index values that are generated by the color data-encoding processing unit 118 of the encoding device 110. Further, the decoding device 140 also includes a multivalue image decoding unit in the form of the multivalue image-decoding processing unit 146 that decodes to the RGB band data that is the multivalue image data, the multivalue run length data that includes the decoded RGB data and the run lengths that correspond to the respective RGB data. Due to this, the multivalue run length data, which is encoded by the encoding device 110 that includes the color data-encoding processing unit 118, can be decoded to the RGB band data.

Further, the decoding device 140 of the printer according to the embodiment includes a repeated decoding unit in the form of the repeated decoding processing unit 145 that decodes to the run lengths and the RGB data of the multiple runs, the repeat data that is encoded by the repeated encoding processing unit 117 that is a repeated encoding device of the encoding device 110. Due to this, the multivalue run length data, which is encoded by the encoding device 110 that includes the repeated encoding processing unit 117, can be decoded to the RGB band data.

Further, the decoding device 140 of the printer according to the embodiment includes the color data-decoding processing unit 144 that decodes the index value, in the data that is transmitted from the color data-encoding processing unit 118 of the encoding device 110, to the RGB data that corresponds to the index value in the dictionary data, and executes, while setting the index value of the RGB data to the topmost value, a process to shift to one space below, the index values of the RGB data that correspond to the index values that are higher than the index value of the RGB data. Due to this, the multivalue run length data, which is encoded by the encoding device 110 that includes the color data-encoding processing unit 118, can be decoded to the RGB band data.

Further, the decoding device 140 of the printer according to the embodiment includes re-reading units (the line memory control unit 147 and the RGB line data-storing unit 148) that sequentially expand, to the multiple matrix partition area that are partitioned such that the multiple pixels are aligned in the vertical direction and in the horizontal direction in the two-line virtual matrix area that is a pixel area of a predetermined number of the horizontal lines, the multivalue run length data that is encoded by the multivalue run length-encoding processing unit 116 of the encoding device 110, and scan the same multivalue run length data in horizontal line units. Due to this, even if the multivalue run length data includes the pixel data aligned in a format that cannot be subjected to a printer engine process, the data of each pixel in the multivalue run length data can be converted into a pixel alignment of a format that can be subjected to the printer engine process, and the data can be distributed to the printer engine 190.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-data encoding device that encodes multivalue image data, the image-data encoding device comprising:
   a reading unit that reads image data;
   a re-reading unit that re-reads the image data read by the reading unit by performing, in a pixel matrix including a plurality of pixels of the image data read by the reading unit, a process of scanning pixels in a partition in which at least two pixels are respectively aligned in a column direction and in a row direction in a predetermined order in a predetermined alignment sequence of partitions; and
   a multivalue run length-encoding unit that encodes the image data re-read by the re-reading unit to multivalue run length data indicating at least color data and run lengths of the color data.

2. An image-data decoding device for decoding encoded data that is obtained by encoding multivalue image data, the image-data decoding device comprising a multivalue-image decoding unit that decodes the multivalue run length data encoded by the multivalue run length-encoding unit of the image data encoding device according to claim 1 by expanding the multivalue run length data to each pixel, while scanning, in a pixel matrix including a plurality of pixels, pixels in a partition in which at least two pixels are respectively aligned in a column direction and in a row direction in a predetermined order in a predetermined alignment sequence of partitions.

3. An image forming apparatus comprising:
   an image-data obtaining unit that obtains multivalue image data;
   the image-data encoding device according to claim 1;
   an image-data decoding device that decodes encoded data that is obtained by encoding multivalue image data, the image-data decoding device including a multivalue-image decoding unit that decodes the multivalue run length data encoded by the multivalue run length-encoding unit by expanding the multivalue run length data to each pixel, while scanning, in a pixel matrix including a plurality of pixels, pixels in a partition in which at least two pixels are respectively aligned in a column direction and in a row direction in a predetermined order in a predetermined alignment sequence of partitions; and
   an image forming unit that forms an image based on the multivalue image data decoded by the image-data decoding device.

4. An image-data encoding method of encoding multivalue image data, the image-data encoding method comprising:
   reading image data;
   re-reading the image data read at the reading by performing, in a pixel matrix including a plurality of pixels of the image data read at the reading, a process of scanning pixels in a partition in which at least two pixels are respectively aligned in a column direction and in a row direction in a predetermined order in a predetermined alignment sequence of partitions; and
   encoding, using a processor, the image data re-read at the re-reading to multivalue run length data indicating at least color data and run lengths of the color data.

5. An image-data decoding method of decoding encoded data that is obtained by encoding multivalue image data, the image-data decoding method comprising:
   decoding, using a processor, the multivalue run length data encoded at the encoding of the image data encoding method according to claim 4 by expanding the multivalue run length data to each pixel, while scanning, in a pixel matrix including a plurality of pixels, pixels in a partition in which at least two pixels are respectively aligned in a column direction and in a row direction in a predetermined order in a predetermined alignment sequence of partitions.

6. An image forming method comprising:
   obtaining multivalue image data;
   the encoding of the image-data encoding method according to claim 4;
   decoding encoded data that is obtained by encoding multivalue image data, the decoding including decoding the multivalue run length data encoded at the encoding by expanding the multivalue run length data to each pixel, while scanning, in a pixel matrix including a plurality of pixels, pixels in a partition in which at least two pixels are respectively aligned in a column direction and in a row direction in a predetermined order in a predetermined alignment sequence of partitions; and
   forming, using a processor, an image based on the multivalue image data decoded at the decoding.

7. An image-data encoding device that encodes multivalue image data, the image-data encoding device comprising:
   a dictionary-data storing unit that stores therein dictionary data in which color data is associated with an index value that is index data of the color data;
   a multivalue run length-encoding unit that encodes image data to multivalue run length data indicating at least color data and run length of the color data; and
   a color-data encoding unit that encodes the color data in each individual run of the multivalue run length data to the index value based on the dictionary data.

8. The image-data encoding device according to claim 7, further comprising a repeated encoding unit that detects, in the multivalue run length data, a regular repetition of runs that are isochromatic having same length, and encodes the runs that appear repeatedly to repeat data.

9. An image-data decoding device for decoding encoded data that is obtained by encoding multivalue image data, the image-data decoding device comprising:
   a color-data decoding unit that decodes the index value that is generated by the color-data encoding unit of the image-data encoding device according to claim 8 to color data based on the dictionary data;
   a multivalue-image decoding unit that decodes multivalue run length data including the color data decoded by the color-data decoding unit and run lengths corresponding to the color data to the multivalue image data; and
   a repeated decoding unit that decodes the repeat data that is encoded by the repeated encoding unit to run lengths and color data of a plurality of runs.

10. The image-data decoding device according to claim 9, wherein the color data decoding unit decodes an index value in data that is transmitted from the color-data encoding unit to color data corresponding to the index value in the dictionary data, and then executes a process for shifting index values of color data corresponding to index values that are higher than the index value of the color data to a lower place while setting the index value of the color data to an uppermost value in the dictionary data.

11. The image-data decoding device according to claim 9, wherein
   the image-data encoding device further includes
      a reading unit that reads image data, and
      a re-reading unit that re-reads the image data read by the reading unit by performing, in a pixel matrix including a plurality of pixels of the image data read by the reading unit, a process of scanning pixels in a partition in which at least two pixels are respectively aligned in a column direction and in a row direction in a predetermined order in a predetermined alignment sequence of partitions, the multivalue run length-encoding unit encodes the image data re-read by the re-reading unit to the multivalue run length data, and the color-data decoding unit decodes the multivalue run length data encoded by the multivalue run length-encoding unit by expanding the multivalue run length data to each pixel, while scanning, in a pixel matrix including a plurality of pixels, pixels in a partition in which at least two pixels are respectively aligned in a column direction and in a row direction in a predetermined order in a predetermined alignment sequence of partitions.

12. An image forming apparatus comprising:
an image-data obtaining unit that obtains multivalue image data;
the image-data encoding device according to claim 8;
an image-data decoding device that decodes encoded data that is obtained by encoding multivalue image data, the image-data decoding device including
a color-data decoding unit that decodes the index value that is generated by the color-data encoding unit to color data based on the dictionary data,
a multivalue-image decoding unit that decodes multivalue run length data including the color data decoded by the color-data decoding unit and run lengths corresponding to the color data to the multivalue image data, and
a repeated decoding unit that decodes the repeat data that is encoded by the repeated encoding unit to run lengths and color data of a plurality of runs; and
an image forming unit that forms an image based on the multivalue image data decoded by the image-data decoding device.

13. The image-data encoding device according to claim 7, wherein
the dictionary data contains a predetermined number of color data, and
the color-data encoding unit determines whether the color data of each individual run in the multivalue run length data is contained in the dictionary data, encodes, when the color data is contained in the dictionary data, the color data to the index value, outputs, when the color data is not contained in the dictionary data, the color data without encoding it to the index value, and then deletes one of the other color data in the dictionary data and executes a process for writing color data that could not be encoded in the dictionary data.

14. The image-data encoding device according to claim 13, wherein
when the color data is contained in the dictionary data, the color-data encoding unit executes a process for shifting index values of color data corresponding to index values that are higher than the index value of the color data to a lower place while setting the index value of the color data to an uppermost value in the dictionary data, and
when the color data is not contained in the dictionary data, the color-data encoding unit deletes the color data corresponding to a lowermost index value in the dictionary data, shifts index values of remaining color data to a lower place, and then executes a process for writing color data that is determined as not being stored in the dictionary data to the dictionary data in association with an uppermost index value.

15. The image-data encoding device according to claim 7, wherein the color-data encoding unit includes a plurality of comparing units for individually comparing the color data of the runs in the multivalue run length data to the mutually differing color data that are contained in the dictionary data.

16. The image-data encoding device according to claim 7, further comprising:
a reading unit that reads image data; and
a re-reading unit that re-reads the image data read by the reading unit by performing, in a pixel matrix including a plurality of pixels of the image data read by the reading unit, a process of scanning pixels in a partition in which at least two pixels are respectively aligned in a column direction and in a row direction in a predetermined order in a predetermined alignment sequence of partitions, wherein
the multivalue run length-encoding unit encodes the image data re-read by the re-reading unit to the multivalue run length data.

17. An image-data decoding device for decoding encoded data that is obtained by encoding multivalue image data, the image-data decoding device comprising:
a color-data decoding unit that decodes the index value that is generated by the color-data encoding unit of the image-data encoding device according to claim 7 to color data based on the dictionary data; and
a multivalue-image decoding unit that decodes multivalue run length data including the color data decoded by the color-data decoding unit and run lengths corresponding to the color data to the multivalue image data.

18. The image-data decoding device according to claim 17, wherein the color data decoding unit decodes an index value in data that is transmitted from the color-data encoding unit to color data corresponding to the index value in the dictionary data, and then executes a process for shifting index values of color data corresponding to index values that are higher than the index value of the color data to a lower place while setting the index value of the color data to an uppermost value in the dictionary data.

19. The image-data decoding device according to claim 17, wherein
the image-data encoding device further includes
a reading unit that reads image data, and
a re-reading unit that re-reads the image data read by the reading unit by performing, in a pixel matrix including a plurality of pixels of the image data read by the reading unit, a process of scanning pixels in a partition in which at least two pixels are respectively aligned in a column direction and in a row direction in a predetermined order in a predetermined alignment sequence of partitions,
the multivalue run length-encoding unit encodes the image data re-read by the re-reading unit to the multivalue run length data, and
the color-data decoding unit decodes the multivalue run length data encoded by the multivalue run length-encoding unit by expanding the multivalue run length data to each pixel, while scanning, in a pixel matrix including a plurality of pixels, pixels in a partition in which at least two pixels are respectively aligned in a column direction and in a row direction in a predetermined order in a predetermined alignment sequence of partitions.

20. An image forming apparatus comprising:
an image-data obtaining unit that obtains multivalue image data;

the image-data encoding device according to claim 7;

an image-data decoding device that decodes encoded data that is obtained by encoding multivalue image data, the image-data decoding device including a color-data decoding unit that decodes the index value that is generated by the color-data encoding unit to color data based on the dictionary data, and a multivalue-image decoding unit that decodes multivalue run length data including the color data decoded by the color-data decoding unit and run lengths corresponding to the color data to the multivalue image data; and an image forming unit that forms an image based on the multivalue image data decoded by the image-data decoding device.

* * * * *